United States Patent [19]
Fukuoka

[11] Patent Number: 5,854,151
[45] Date of Patent: *Dec. 29, 1998

[54] GLASS BODY WITH DISTRIBUTION COMPOSITION

[75] Inventor: Morinao Fukuoka, Hachiooji, Japan

[73] Assignee: Olympus Optical Company Ltd., Tokyo, Japan

[*] Notice: The term of this patent shall not extend beyond the expiration date of Pat. No. 5,366,939.

[21] Appl. No.: 887,330

[22] Filed: Jul. 2, 1997

Related U.S. Application Data

[63] Continuation of Ser. No. 484,327, Jun. 7, 1995, abandoned.

[30] Foreign Application Priority Data

Jun. 8, 1994 [JP] Japan .................................. 6-126576

[51] Int. Cl.$^6$ .................................................. C03C 3/083
[52] U.S. Cl. .................................. 501/68; 501/64; 501/69
[58] Field of Search .................................. 501/12, 68, 69, 501/64

[56] References Cited

U.S. PATENT DOCUMENTS

| | | | |
|---|---|---|---|
| 4,797,376 | 1/1989 | Caldwell et al. ........................... | 501/68 |
| 4,902,650 | 2/1990 | Caldwell et al. . | |
| 5,068,208 | 11/1991 | Haun et al. ............................... | 501/68 |
| 5,069,700 | 12/1991 | Yamane et al. . | |
| 5,166,827 | 11/1992 | Noda . | |
| 5,196,383 | 3/1993 | Ito et al. ................................... | 501/12 |
| 5,308,802 | 5/1994 | Haun ......................................... | 501/12 |
| 5,349,473 | 9/1994 | Kurasawa et al. . | |
| 5,366,939 | 11/1994 | Kurasawa et al. ........................ | 501/69 |

*Primary Examiner*—Karl Group
*Attorney, Agent, or Firm*—Pillsbury Madison & Sutro LLP

[57] ABSTRACT

The present invention provides a glass body with distributed composition which contains, for example, a rare-earth element having a concentration distribution, which can be produced in high yield while inhibiting cracking at the time of vitrification and which has optical properties advantageous in correcting chromatic aberration in image pickup systems. For example, in a four-component glass composed of $SiO_2$, $Al_2O_3$, $Y_2O_3$ and $ZrO_2$ in which $Y_2O_3$ has a recessed parabolic concentration distribution profile being high at the periphery of the glass and low at the center of the glass and in which each of $ZrO_2$ and $Al_2O_3$ has a protrudent parabolic concentration distribution profile lowering from the center of the glass toward the periphery of the glass, there is the relationship:

$$(\Delta C_{Al}/\Delta C_{Ml})/C_{Si} = 0.0334$$

wherein $\Delta C_{Ml}$ is a concentration distribution difference of $Y_2O_3$, $\Delta C_{Al}$ a concentration distribution difference of $Al_2O_3$ and $C_{Si}$ a constant concentration of $SiO_2$. This glass can be obtained in high yield.

10 Claims, 7 Drawing Sheets

GLASS BODY WITH DISTRIBUTION COMPOSITION

This is a continuation of application Ser. No. 08/484,327, filed on Jun. 7, 1995, which was abandoned upon the filing hereof.

BACKGROUND OF THE INVENTION

1. Field of The Invention

The present invention relates to a glass body with distributed composition containing Si, Al and a first metal species other than Si and Al, in which the concentration of at least a metal other than Al changes.

2. Discussion of Related Art

Various glass bodies have been proposed which contain various elements having respective concentration distributions to thereby exhibit refractive index distributions. In particular, the composition distributions of gradient-index optical elements which are available in image pickup systems such as cameras and effective in correcting chromatic aberration are described in Japanese Patent Application Laid-Open Specification Nos. 141302/1991 and 88003/1993 and Japanese Patent Application Laid-Open Specification No. 263474/1994 filed by the same applicant as in the present invention.

Gradient-index glass bodies have concentration distributions which lead to distributions of the thermal expansion coefficient in the glass bodies, thereby causing the glass bodies to suffer from cracking at the step of glass firing or cooling. The employment of potassium for suppressing the distributions of the thermal expansion coefficient in the glass bodies has been proposed in Japanese Patent Application Laid-Open Specification No. 295818/1991.

However, the glasses described in Japanese Patent Application Laid-Open Specification Nos. 88003/1993 and 263474/1994 have not only element distributions but also distributions of the coefficient of thermal expansion therein. That is, when the distribution of the quantity of each element in a glass is taken into account and, in particular, when the number of atoms of a principal component element (for example, Si) is regarded as being constant therein, a protrudent distribution of the number of atoms of a dopant element would cause the coefficient of thermal expansion thereof to have the same distribution profile as the above protrudent distribution profile exhibited by the number of atoms of the dopant element while a recessed distribution of the number of atoms of a dopant element would lead to a recessed distribution profile of the coefficient of thermal expansion of the glass.

The above distribution of the coefficient of thermal expansion has brought about a problem that the glass is cracked at the time of firing or cooling in the glass producing process, thereby ultimately leading to glass body breakage. Illustratively, when a glass body with refractive index distribution is produced according to any of the ion exchange, molecular stuffing, sol-gel and CVD processes, a cooling step subsequent to heat treatment is inevitable, necessary and indispensable. In the step of cooling to room temperature in the production of the above glass body with composition distribution, shrinkages occur which are different according to parts of the glass body, for example, between the center and the periphery of the glass body because of the magnitude of the coefficient of thermal expansion or the difference in coefficient of thermal expansion according to parts of the glass body, so that a stress occurs to cause glass breakage, disadvantageously resulting in an extremely poor yield in the glass production.

On the other hand, the method of regulating the coefficient of thermal expansion of a glass by the use of potassium as described in Japanese Patent Application Laid-Open Specification No. 295818/1991 has had the following drawback. Illustratively, potassium is an alkali metal and forms a glass modifying oxide, so that it does not contribute to formation of a glass skeleton. Hence, when potassium is contained in a gel or glass, the potassium easily moves therein, so that it has been difficult to provide a desirable concentration distribution with the use of potassium. This has led to a drawback that it is difficult to produce a glass body having desired optical properties without cracking.

Further, generally, the glasses having high contents of alkali metals have drawbacks in that their chemical resistances are poor and in that the alkali metal content of each glass is limited.

SUMMARY OF THE INVENTION

The present invention has been made with a view toward resolving the above drawbacks of the prior art.

It is, therefore, an object of the present invention to provide a glass body with composition distribution which has optical properties effective in correcting the chromatic aberration of an image pick-up system while preventing cracking and glass body breakage.

The foregoing and other objects, features and advantages of the present invention will become apparent from the following detailed description and appended claims taken in connection with the accompanying drawings.

DETAILED DESCRIPTION OF THE INVENTION

Figure 1:
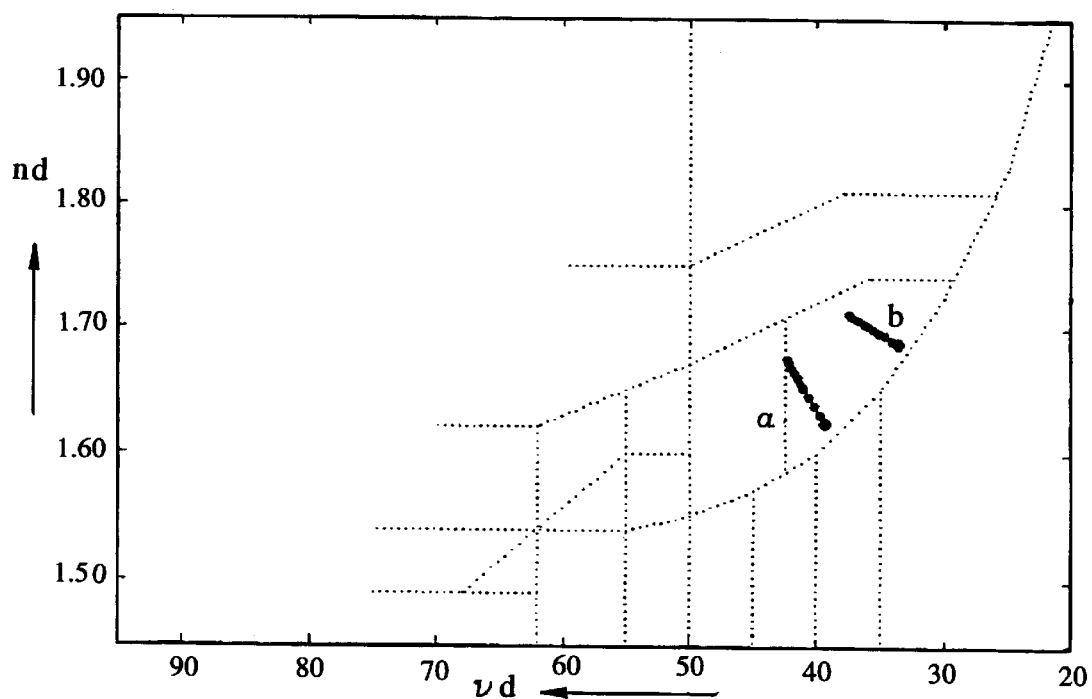
FIG. 1 is a view showing typical optical properties of a glass body with Al concentration distribution, in which a indicates optical properties of a glass body having a uniform distribution of Al and b optical properties of a glass body with Al concentration distribution.

According to the present invention, in order to attain the above objects of the present invention, there is provided a glass body with distributed composition containing Si, Al and a first metal species other than Si and Al in which, when the contained metal species are expressed by oxide component ratios, the component ratio of the oxide of the first metal species changes in the glass body, wherein, when the component ratio of $SiO_2$ at a position of the glass body where the component ratio of the oxide of the first metal species is the largest is expressed as $C_{Si}$ being a value constant throughout the glass body and when the difference between maximum and minimum of the component ratio of $Al_2O_3$ contained in the glass body and that of the component ratio of the first metal species contained in the glass body are expressed as $\Delta C_{Al}$ and $\Delta C_{Ml}$, respectively, under the condition of the $C_{Si}$ being constant throughout the glass body, the value of:

$(\Delta C_{Al}/\Delta C_{Ml})/C_{Si}$ ranges from −0.12 to 0.12.

Further, the present invention provides a glass body with distributed composition as mentioned above, wherein the first metal species is at least one element selected from the group consisting of rare-earth and alkaline-earth elements and Zn.

Still further, the present invention provides a glass body with distributed composition as mentioned above, which further contains at least one second metal species other than the first metal species, said second metal species being selected from the group consisting of Nb, Ta, Ti, Pb, Zr, Bi, Sb, Ag, Sn, In, Tl and Zn.

Still further, the present invention provides a glass body with distributed composition as mentioned above, wherein the ratio in number of atoms of a metal element other than Si and Al to Si has a gradient which changes in the same direction as that of the ratio in number of atoms of Al to Si.

When the metal concentration at a point of a glass body with distributed composition is expressed by mol % of metal oxide, an increase in the content of a metal species is accompanied by a decrease in the content of another metal species. Herein, however, the composition distribution of a glass will be described as the change of the ratio of the metal oxide to $SiO_2$ for the purpose of facilitating the description.

A detailed description will be made below. When the glass is composed of metal oxides $SiO_2$, $Al_2O_3$ and $M_{1a}O_b$ (metallic oxide from metal species $M_1$), each point of the glass may be expressed as $x.SiO_2$-$y.Al_2O_3$-$z.M_{1a}O_b$, in which x, y and z represent mol percents of $SiO_2$, $Al_2O_3$ and $M_{1a}O_b$, respectively and satisfy the relationship: $x+y+z=100$ mol %.

In particular, when the metal oxide having its concentration varied according to points of the glass is $M_{1a}O_b$, the x as the mol % of $SiO_2$ at which the z value of the component $M_{1a}O_b$ is the maximum is standardized as being constant through the points of the glass. This x employed in the standardization is defined as $C_{Si}$. The difference between the maximum concentration and the minimum concentration of $Al_2O_3$ exhibited under the condition of $C_{Si}$ being constant through the glass body is defined as $\Delta C_{Al}$. The difference between the maximum concentration and the minimum concentration of $M_{1a}O_b$ exhibited under the condition of $C_{Si}$ being constant through the glass body is defined as $\Delta C_{Ml}$. The following description will be made with the use of the thus standardized values $C_{Si}$, $\Delta C_{Al}$ and $\Delta C_{Ml}$.

When the glass body contains Si, Al and a first metal species other than Si and Al in which, when the contained metal species are expressed by oxide component ratios, the component ratio of the oxide of the first metal species changes in the glass body, and in particular when the value of $(\Delta C_{Al}/\Delta C_{Ml})/C_{Si}$ ranges from −0.12 to 0.12, the glass body with distributed composition can be produced in high yield. The yield can further be improved by limiting the value of $(\Delta C_{Al}/\Delta C_{Ml})/C_{Si}$ so as to range from −0.08 to 0.08. The yield can still further be improved by narrowing the range of the value of $(\Delta C_{Al}/\Delta C_{Ml})/C_{Si}$ to −0.06 to 0.06 and further −0.04 to 0.04.

The above has reduced the stress occurring due to a difference in shrinkage according to points of the glass body, for example, between the center and the periphery of the glass body during a cooling step in the process for producing a glass body with distributed composition, thereby reducing cracking, with the result that the glass production yield has greatly been improved. Moreover, it has become feasible to simultaneously control the color dispersion characteristics of the glass body by providing Al with a concentration distribution. Referring to FIG. 1, a indicates the optical characteristics of a four-component glass body composed of $SiO_2$-$Al_2O_3$—$M_{1a}O_b$—$M_{2c}O_d$ ($M_{2c}O_d$ is metallic oxide from metal species $M_2$) in which the concentration of Al is uniform, and b indicates those in which the concentration of Al is distributed. FIG. 1 shows that the optical characteristics of both of a and b are those which are effective in correcting the chromatic aberration of an image pick-up system as described in Japanese Patent Application Laid-Open Specification No. 88003/1993. Therefore, a glass body having optical characteristics which are effective in correcting the chromatic aberration of various image pick-up systems can be obtained from a four-component glass body expressed by metal oxides by uniformizing or nonuniformly changing the concentration distribution profile of Al. With respect to the three-component glass body represented by $SiO_2$—$Al_2O_3$—$M_{1a}O_b$, a glass in which the concentration of Al is distributed is preferred as from the viewpoint of optical characteristics effective in correcting the chromatic aberration of an image pick-up system.

From the viewpoint that the above function is fully exhibited, it is preferred that the first metal species be at least one element selected from the group consisting of rare-earth and alkaline-earth elements and Zn and that the second metal species be at least one element selected from the group consisting of Nb, Ta, Ti, Pb, Zr, Bi, Sb, Ag, Sn, In, Ti and Zn. The resultant glass body has the same excellent optical characteristics as those described in Japanese Patent Application Laid-Open Specification Nos. 141302/1991, 88003/1993 and 263474/1994. The element of second metal species selected from among Nb, Ta, Ti, Pb, Zr, Bi, Sb, Ag, Sn, In, Tl and Zn may either be provided or not be provided with a concentration distribution in the glass body.

The glass body of the present invention may contain a metal species other than Si, Al and the first metal species. The effect of the present invention can be exerted irrespective of whether or not the other metal species has a concentration distribution. The terminology "metal species" used herein means a cation of any of the oxides composing the glass. Accordingly, matter such as silicon (Si), boron (B) or phosphorus (P) which is generally categorized as being nonmetallic is included in the metal species used in the present invention because the matter can be a cation of an oxide being a constituent of the glass.

Especially, when the value of $(\Delta C_{Al}/\Delta C_{Ml})/C_{Si}$ is in the range of 0 to 0.12, the glass body with distributed composition can be produced in higher yield. This means that the metal concentration distribution of a glass body having excellent optical properties as specified in, for example, Japanese Patent Application Laid-Open Specification Nos.

Figure 2A:
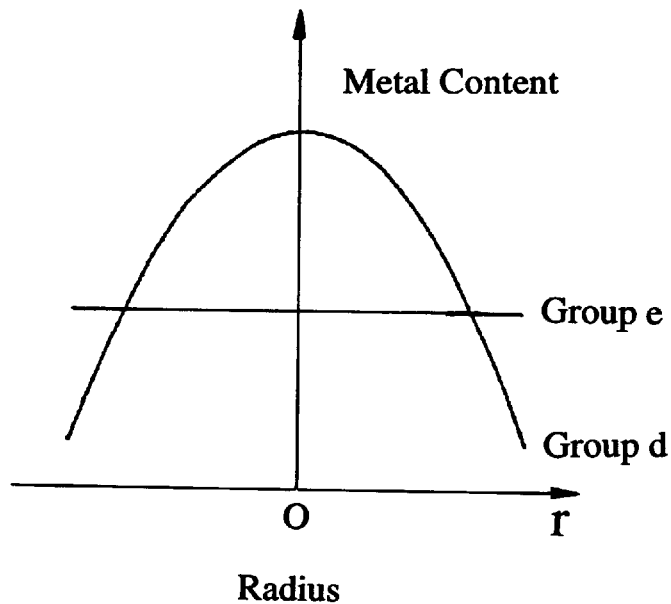
FIGS. 2(A) and 2(B) is a conceptual diagram showing distributions of metal species content in which metal species d is distributed with a gradient while metal species e has a substantially flat distribution.
Figure 2B:
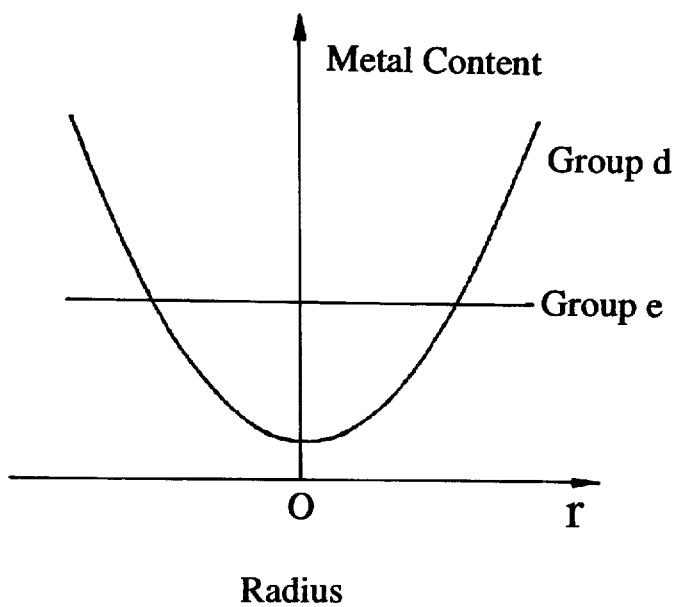
Figure 3A:
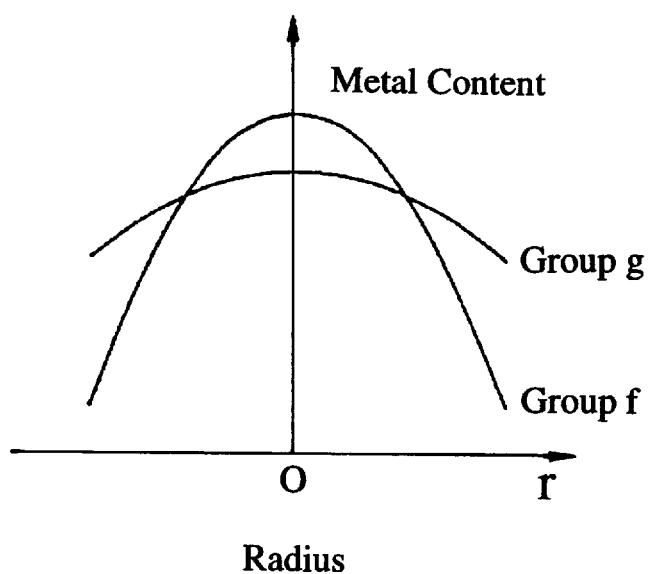
FIGS. 3(A) and 3(B) is a conceptual diagram showing distributions of metal species content in which metal species f is distributed in the same direction as that of metal species g with a gradient smaller than that of metal species g.
Figure 3B:
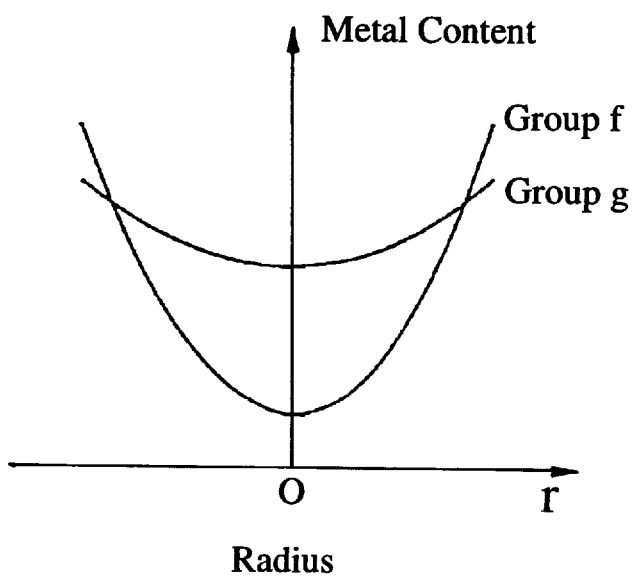

88003/1993 and 263474/1994 has a profile as shown in FIGS. 2 and 3. When the concentration of Al is changed in the same direction as that of group d or groups f and g, for example, when Al has the same protrudent concentration distribution as group d in FIG. 2 (A) or when Al has the same recessed concentration distribution as groups f and g in FIG. 3 (B), marked advantages are brought about such that cracking can be prevented and that the glass body can have optical properties which are effective in correcting the chromatic aberration of an image pick-up system.

The above incorporation of Al into glass reduces the thermal expansion coefficient difference of the glass body. The control of the thermal expansion coefficient difference to $50 \times 10^{-7}$ ($K^{-1}$) or less leads to yield improvement. Preferably, the thermal expansion coefficient difference of the glass body is controlled so as to be $20 \times 10^{-7}$ ($K^{-1}$) or less.

The addition of Al to the Si-containing glass with distributed composition exerts the following other functions than the above yield improvement in glass production relating to the coefficient of thermal expansion and the above improvement of optical properties with respect to the correction of the chromatic aberration of an image pick-up system. That is, as compared with the reduction of the thermal expansion coefficient difference by the use of an alkali metal such as potassium as described in Japanese Patent Application Laid-Open Specification No. 295818/1991, the employment of Al improves not only the chemical durability of the produced glass body but also the rigidity and elasticity thereof. Further, the incorporation of Al is advantageous over the alkali metal in that, for example, Al can be incorporated in the glass in an amount less limited than in the use of the alkali metal.

The above functions of Al can be exerted irrespective of the type of glass system as long as it is based on silica. Especially, the addition of Al to a silica glass doped with a rare-earth element is advantageous from the viewpoint of the optical ability to correct the chromatic aberration because it enlarges the vitrification range and permits stably doping the glass with the rare-earth element in large quantity.

Figure 4:
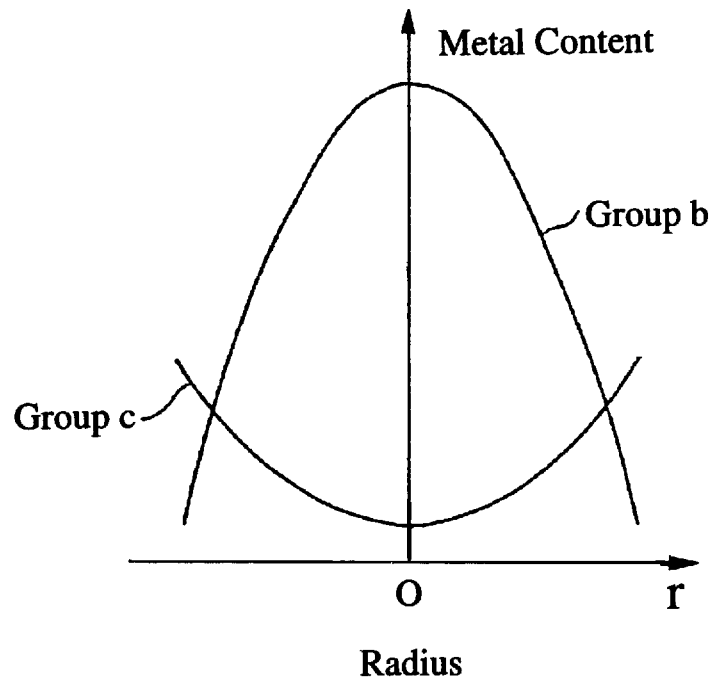
FIGS. 4(A) and 4(B) is a conceptual diagram showing distributions of metal species content in which metal species b and c have mutually opposite concentration distribution profiles.
Figure 4:
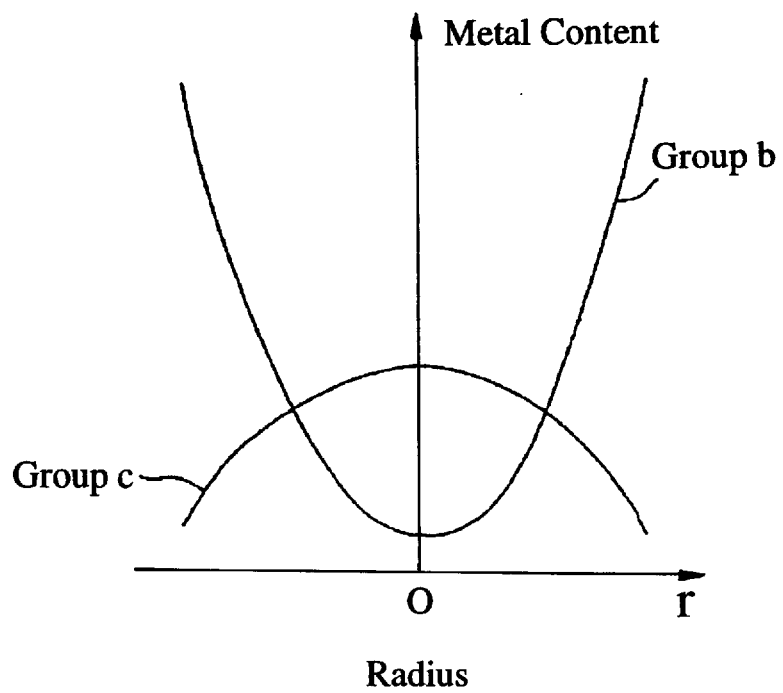

In the four-component glass body with distributed composition composed of $SiO_2$—$Al_2O_3$—$M_{1a}O_b$—$M_{2c}O_d$ according to the present invention, for attaining the desired effect, the oxide of first metal species $M_{1a}O_b$ and the oxide of second metal species $M_{2c}O_d$ may have any of, for example, the following concentration distribution profiles:

(1) in which $M_{1a}O_b$ has a gradient distribution while $M_{2c}O_d$ has a flat distribution like the concentration distribution of FIG. 2 showing the gradient distribution of metal species d and the substantially flat distribution of metal species e as specified in Japanese Patent Application Laid-Open Specification No. 88003/1993;

(2) in which the distribution of $M_{1a}O_b$ is gradient as in that of metal species f while the distribution of $M_{2c}O_d$ is gradient as in that of metal species g like the concentration distribution of FIG. 3 showing the distribution of metal species f made in the same direction as that of metal species g at a gradient smaller than that of metal species g as specified in Japanese Patent Application Laid-Open Specification No. 263474/1994; and (3) in which the distribution of $M_{1a}O_b$ is gradient as in that of metal species b while the distribution of $M_{2c}O_d$ is gradient as in that of metal species c like the concentration distribution of FIG. 4 showing the mutually opposite concentration distribution profiles of metal species b and c as specified in Japanese Patent Application Laid-Open Specification No. 141302/1991.

The distribution profile of metal species according to the present invention is not limited to the vertical distribution of FIGS. 2 to 4 and can also apply to a metal species distribution along the optical axis and to a spherical metal species distribution.

Any other elements can be incorporated without any limitation in the glass body for the purpose of property improvement, e.g., for improving the optical properties and the chemical durability thereof and for facilitating the vitrification as long as the incorporation is not detrimental to the desired effects of the present invention.

The present invention directed to the glass body with refractive index distribution can apply to any of the glass body producing processes, such as the ion exchange, molecular stuffing, sol-gel, glass lamination (thin glass plates are piled one upon another and fused), CVD and VAD processes.

As apparent from the above, the present invention cancels any distribution of thermal expansion coefficient in the glass body with distributed composition, thereby preventing cracking in the cooling step. Further, the color dispersion characteristic being an optical property effective in correcting the chromatic aberration of an image pick-up system can be controlled in the present invention. Therefore, for example, a glass body having distributed concentrations of a rare-earth element or the like to thereby have a refractive index distribution ensuring high optical effects in consideration of color dispersion and other characteristics can be produced in high yield by the present invention.

Preferred Embodiment of The Invention

The present invention will now be described in greater detail with reference to the following Examples, which should not be construed as limiting the scope of the invention.

EXAMPLE 1

Provided that any glass is expressed in terms of metal oxides, this Example relates to a glass body composed of $SiO_2$, $Al_2O_3$ and $BaO$, in which Ba is used as the first metal species and only Ba has a concentration distribution. In the glass body, BaO had a parabolic distribution having the maximum at the center of the glass body and the minimum at the periphery of the glass body. The concentrations of $SiO_2$, $Al_2O_3$ and BaO at the center point where the mol % of BaO was the maximum were 46.1, 23.1 and 30.8 mol %, respectively. The mol % of $SiO_2$ at the center point, i.e., 46.1 mol % was regarded as being constant through the glass body, and the mol % concentrations of $Al_2O_3$ and BaO at each point of the glass body were standardized. Table 1 shows the standardized component ratios at the center and periphery of the glass body and the refractive index, dispersion and other properties of the glass body. The standardized component ratio values at the periphery of the glass body were 46.1 $SiO_2$—3.8 BaO—0 $Al_2O_3$. The $(\Delta C_{Al}/\Delta C_{Ml})/C_{Si}$ of the glass body with distributed composition was 0.0186.

With respect to the properties of the glass body, the refractive index nd and the dispersion vd at the center were 1.6100 and 56, respectively while the refractive index nd and the dispersion d at the periphery were 1.4945 and 64.3, respectively, as shown in Table 1. Thus, the refractive index had a protrudent parabolic distribution being high at the center and low at the periphery of the glass body. This refractive index difference together with the difference in dispersion vd ($\Delta n$: 0.1155 and $\Delta vd$: 8.3) ensured the effectivity of the glass body in correcting the chromatic aberration at the use in an image pick-up system. The coefficients of thermal expansion at the center and periphery of the glass body were measured and found to be 71.0 (meaning 71.0× $10^{-7}$ $K^{-1}$, same below) and 27.1, respectively, whose difference ($\Delta\alpha$) was 43.9. This glass body suffered from little cracking in the cooling step of the production process and thus was produced in high yield.

EXAMPLE 2

This Example is a modification of Example 1, in which the standardized mol % of BaO at the periphery of the glass body is different from that of Example 1. The component ratios, refractive index and other properties are given in Table 1 under those of Example 1. This glass body also suffered from little cracking in the cooling step of the production process and thus was produced in high yield.

Example 3 and those which follow the same relate to glass bodies composed of at least four types of metal oxides provided that any glass is expressed in terms of metal oxides.

Detailed description will be made below with respect to Example 3 as a representative thereof.

EXAMPLE 3

Provided that any glass is expressed in terms of metal oxides, this Example relates to a glass body composed of $SiO_2$, $Al_2O_3$, $Y_2O_3$ and $ZrO_2$, in which Y and Zr are used as the first metal species and the second metal species, respectively, and Y as the first metal species and Zr as the second metal species have concentration distributions.

In the glass body, $Y_2O_3$ being an oxide of a first metal species had a recessed parabolic distribution being high at the periphery of the glass body and low at the center of the glass body. The concentrations of $SiO_2$, $Al_2O_3$, $Y_2O_3$ and $ZrO_2$ at the periphery where the mol % of $Y_2O_3$ being an oxide of a first metal species was the maximum were 59.83, 25.64, 12.82 and 1.71 mol %, respectively. The 59.83 mol % of $SiO_2$ was regarded as being constant through the glass body, and the mol % concentrations of $Al_2O_3$, $Y_2O_3$ and $ZrO_2$ at each point of the glass body were standardized. Both the component ratios of $ZrO_2$ and $Al_2O_3$ had protrudent parabolic distributions lowering from the center toward the periphery of the glass body. The $(\Delta C_{Al}/\Delta C_{Ml})/C_{Si}$ of the glass body with distributed composition was 0.0334.

The refractive index and dispersion of the glass body were measured, and it was found that the nd and vd values at the center were 1.5477 and 52.8, respectively while the nd and vd values at the periphery were 1.5779 and 53.8, respectively. Thus, the refractive index had a recessed parabolic distribution being low at the center and high at the periphery of the glass body. The glass body was effective in correcting the chromatic aberration at the use in an image pick-up system.

The coefficients of thermal expansion at the center and periphery of the glass body were measured and found to be 8.0 and 32.0, respectively, whose difference ($\Delta\alpha$) was 24.0. This glass body suffered from little cracking in the cooling step of the production process and thus was produced in high yield.

Table 1 shows the standardized composition ratios at the center and periphery and the refractive index, dispersion, coefficient of thermal expansion and $(\Delta C_{Al}/\Delta C_{Ml})/C_{Si}$ of each of the glass bodies of Examples 1 to 3 and 4 to 12. In the following description of the Examples, the optical properties of glass and crack prevention as natural consequences of the effect of the present invention will not be mentioned and only the effects peculiar to the particular Examples will be mentioned.

EXAMPLES 4 to 7

These Examples relate to glass bodies each composed of $SiO_2$—$Al_2O_3$—$Y_2O_3$—$ZrO_2$ as in Example 3. The glass bodies of these Examples are different from the glass body of Example 3 in the concentration distribution profile of each metal oxide and in the distributed component ratios. The component ratios, refractive index and other properties of each of the glass bodies of these Examples are given in Table 1.

With respect the component ratios of the glass bodies of these Examples, the maximum of the $(\Delta C_{Al}/\Delta C_{Ml})/C_{Si}$ was 0.0407 while the minimum thereof was 0.0136, thereby satisfying the relationship:

$$-0.06 \leq (\Delta C_{Al}/\Delta C_{Ml})/C_{Si} \leq 0.06.$$

Thus, each of the glass bodies suffered from little cracking and thus was produced in high yield.

EXAMPLES 8 to 19

These Examples relate to glass bodies each composed of $SiO_2$—$Al_2O_3$—$Y_2O_3$—$TiO_2$ in which $Y_2O_3$ and $TiO_2$ are employed as oxides of a first metal species and a second metal species, respectively. The glass bodies of these Examples are varied from each other in the concentration distribution profile of each metal oxide and in the distributed component ratios. The component ratios, refractive index and other properties of each of the glass bodies of these Examples are given in Tables 1 and 2.

With respect the component ratios of the glass bodies of these Examples, the maximum of the $(\Delta C_{Al}/\Delta C_{Ml})/C_{Si}$ was 0.0705 while the minimum thereof was −0.0121, thereby satisfying the relationship:

$$-0.08 \leq (\Delta C_{Al}/\Delta C_{Ml})/C_{Si} \leq 0.08.$$

Thus, each of the glass bodies suffered from little cracking and thus was produced in high yield.

EXAMPLE 20

This Example relates to a glass body composed of $SiO_2$—$Al_2O_3$—$La_2O_3$—$TiO_2$ in which $La_2O_3$ and $TiO_2$ are employed as oxides of a first metal species and a second metal species, respectively. In the glass body, $La_2O_3$ had what appeared to be a protrudent parabolic concentration distribution being high at the center and low at the periphery of the glass body. The concentration distribution of $TiO_2$ in the glass body was in the same direction as that of $La_2O_3$ and had what appeared to be a protrudent parabolic distribution being high at the center and low at the periphery of the glass body. The component ratio of $Al_2O_3$ was constant through the glass body, which was 25 mol %. The component ratios, refractive index and other properties of the glass body of this Example are given in Table 2.

With respect the component ratios of this glass body, $(\Delta C_{Al}/\Delta C_{Ml})/C_{Si}$ was 0.

EXAMPLES 21 TO 23

These Examples relate to glass bodies each composed of $SiO_2$—$Al_2O_3$—$Y_2O_3$—$PbO$ in which $Y_2O_3$ and $PbO$ are employed as oxides of a first metal species and a second metal species, respectively. The glass bodies of these Examples are varied from each other in the concentration distribution profile of each metal oxide and in the distributed component ratios. The component ratios, refractive index and other properties of each of the glass bodies of these Examples are given in Table 2.

With respect the component ratios of the glass bodies of these Examples, the maximum of the $(\Delta C_{Al}/\Delta C_{Ml})/C_{Si}$ was 0.056 while the minimum thereof was 0, thereby satisfying the relationship:

$$-0.06 \leq (\Delta C_{Al}/\Delta C_{Ml})/C_{Si} \leq 0.06.$$

EXAMPLES 24 AND 25

These Examples relate to glass bodies each composed of $SiO_2$—$Al_2O_3$—CaO—PbO—ZnO in which CaO, i.e., an oxide of Ca being one of the alkaline-earth metals is employed as an oxide of a first metal species and PbO and ZnO are employed as oxides of second metal species. In the glass bodies of these Examples, CaO had a protrudent parabolic distribution being high at the center and low at the periphery of each of the glass bodies, PbO had a recessed parabolic distribution being low at the center and high at the periphery of each of the glass bodies, and ZnO had a protrudent parabolic distribution being high at the center and low at the periphery of each of the glass bodies. Further, in Example 24, $Al_2O_3$ had a concentration distribution which was a protrudent parabolic one being high at the center and low at the periphery of the glass body.

EXAMPLES 26 TO 28

These Examples relate to glass bodies each composed of six components, i.e., the same five components as in Examples 24 and 25 plus SrO, i.e., $SiO_2$—$Al_2O_3$—CaO—SrO—PbO—ZnO in which CaO, i.e., an oxide of Ca being one of the alkaline-earth metals and SrO, i.e., an oxide of Sr are employed as oxides of first metal species and PbO and ZnO are employed as oxides of second metal species. When at least two metal oxides were contained as the first metal species, $C_{Si}$ was determined as the sum of the component ratios thereof, followed by standardization. In the glass bodies of these Examples, the concentration distributions of CaO and SrO were in the same direction and had protrudent parabolic distributions being high at the center and low at the periphery of each of the glass bodies.

The component ratios, refractive index and other properties of each of the glass bodies of Examples 24 to 28 are given in Table 3.

With respect the component ratios of the glass bodies of Examples 24 to 28, the maximum of the $(\Delta C_{Al}/\Delta C_{Ml})/C_{Si}$ was 0.0236 while the minimum thereof was 0, thereby satisfying the relationship:

$$-0.04 \leq (\Delta C_{Al}/\Delta C_{Ml})/C_{Si} \leq 0.04.$$

Even when at least two metal oxides were contained as the first metal species and had mutually different distribution profiles, for example, even when their protrudent distribution profiles had mutually different center portions or when protrudent and recessed distribution profiles were simultaneously contained, calculation of the component ratios, etc. (including standardization) was conducted with the use of the sum of the component ratios of at least two metal oxides as the first metal species.

EXAMPLES 29 TO 31

These Examples relate to glass bodies each composed of $SiO_2$—$Al_2O_3$—SrO—PbO in which SrO i.e., an oxide of Sr being one of the alkaline-earth metals is employed as an oxide of a first metal species and PbO as an oxide of a second metal species. The component ratios, refractive index and other properties of each of the glass bodies of these Examples are given in Table 4. With respect the component ratios of the glass bodies of these Examples, the maximum of the $(\Delta C_{Al}/\Delta C_{Ml})/C_{Si}$ was 0.0227 while the minimum thereof was 0, thereby satisfying the relationship:

$$-0.04 \leq (\Delta C_{Al}/\Delta C_{Ml})/C_{Si} \leq 0.04.$$

EXAMPLES 32 TO 37

These Examples relate to glass bodies each composed of $SiO_2$—$Al_2O_3$—BaO—$M_{2c}O_d$ in which BaO i.e., an oxide of Ba being one of the alkaline-earth metals is employed as an oxide of a first metal species and at least one member selected from among PbO, $Ta_2O_5$ and $TiO_2$ as $M_{2c}O_d$ an oxide of a second metal species. The component ratios, refractive index and other properties of each of the glass bodies of these Examples are given in Table 4. With respect the component ratios of the glass bodies of these Examples, the maximum of the $(\Delta C_{Al}/\Delta C_{Ml})/C_{Si}$ was 0.0476 while the minimum thereof was 0, thereby satisfying the relationship:

$$-0.06 \leq (\Delta C_{Al}/\Delta C_{Ml})/C_{Si} \leq 0.06.$$

EXAMPLES 38 AND 39

These Examples relate to glass bodies each composed of $SiO_2$—$Al_2O_3$—$Y_2O_3$—$M_{2c}O_d$ in which $Y_2O_3$, i.e., an oxide of Y being one of the rare-earth metals is employed as an oxide of a first metal species and at least one member selected from among $Ta_2O_5$ and $Nb_2O_5$ as $M_{2c}O_d$ an oxide of a second metal species. The component ratios, refractive index and other properties of each of the glass bodies of these Examples are given in Table 4. With respect the component ratios of the glass bodies of these Examples, the maximum of the $(\Delta C_{Al}/\Delta C_{Ml})/C_{Si}$ was 0.0119 while the minimum thereof was 0.0055, thereby satisfying the relationship:

$$-0.04 \leq (\Delta C_{Al}/\Delta C_{Ml})/C_{Si} \leq 0.04.$$

EXAMPLES 40 TO 43

These Examples relate to glass bodies each composed of $SiO_2$—$Al_2O_3$—$La_2O_3$—$M_{2c}O_d$ in which $La_2O_3$, i.e., an oxide of La being one of the rare-earth metals is employed as an oxide of a first metal species and at least one member selected from among $TiO_2$, $Ta_2O_5$ and $Nb_2O_5$ as $M_{2c}O_d$ an oxide of a second metal species. The component ratios, refractive index and other properties of each of the glass bodies of these Examples are given in Table 4. With respect the component ratios of the glass bodies of these Examples, the maximum of the $(\Delta C_{Al}/\Delta C_{Ml})/C_{Si}$ was 0.0353 while the minimum thereof was 0.0110, thereby satisfying the relationship:

$$-0.04 \leq (\Delta C_{Al}/\Delta C_{Ml})/C_{Si} \leq 0.04.$$

Figure 5:
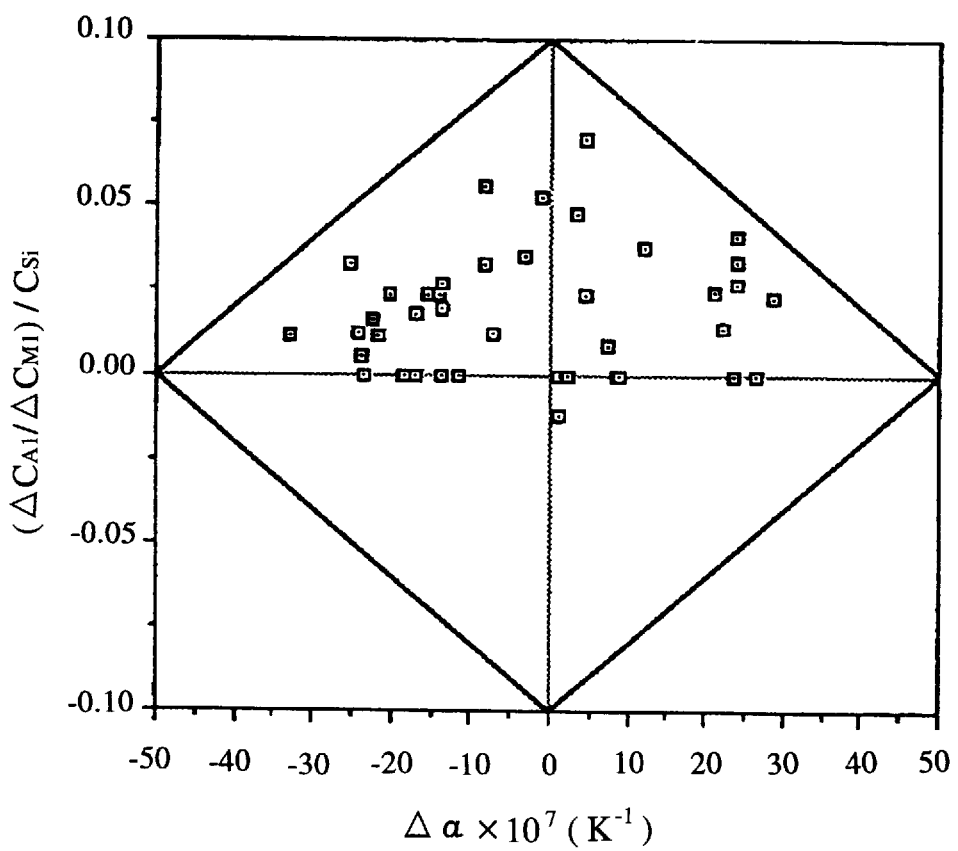
FIG. 5 is a view showing the relationship between $(\Delta C_{Al}/\Delta C_{Ml})/C_{Si}$ and difference in coefficient of thermal expansion $(\Delta \alpha)$ with respect to the glass bodies of Examples 3 to 43.

With respect to each of the glass bodies of Examples 3 to 43, the relationship between the thermal expansion coefficient difference ($\Delta\alpha$) and the $(\Delta C_{Al}/\Delta C_{Ml})/C_{Si}$ was graphed, thereby obtaining FIG. 5.

When X and Y were defined as $X = \Delta\alpha \times 10^7$ K and $Y = (\Delta C_{Al}/\Delta C_{Ml})/C_{Si}$ and satisfied the following relationships:

$$Y + 0.1 \geq |(0.1/50) \cdot X| \tag{1},$$

and $$0.1-Y \geq |(0.1/50) \cdot X| \quad (2),$$

the cracking and breakage during the cooling step were prevented and an optical element having optical properties advantageous for correcting the chromatic aberration of an image pick-up system could be obtained.

EXAMPLES 44 TO 71

Each of the glass bodies of these Examples is composed of $SiO_2$—$Al_2O_3$—$M_{1a}O_b$—$M_{2c}O_d$, in which $M_{2c}O_d$, i.e., an oxide of a second metal species is distributed at a nearly constant value through the glass body.

Figure 6:
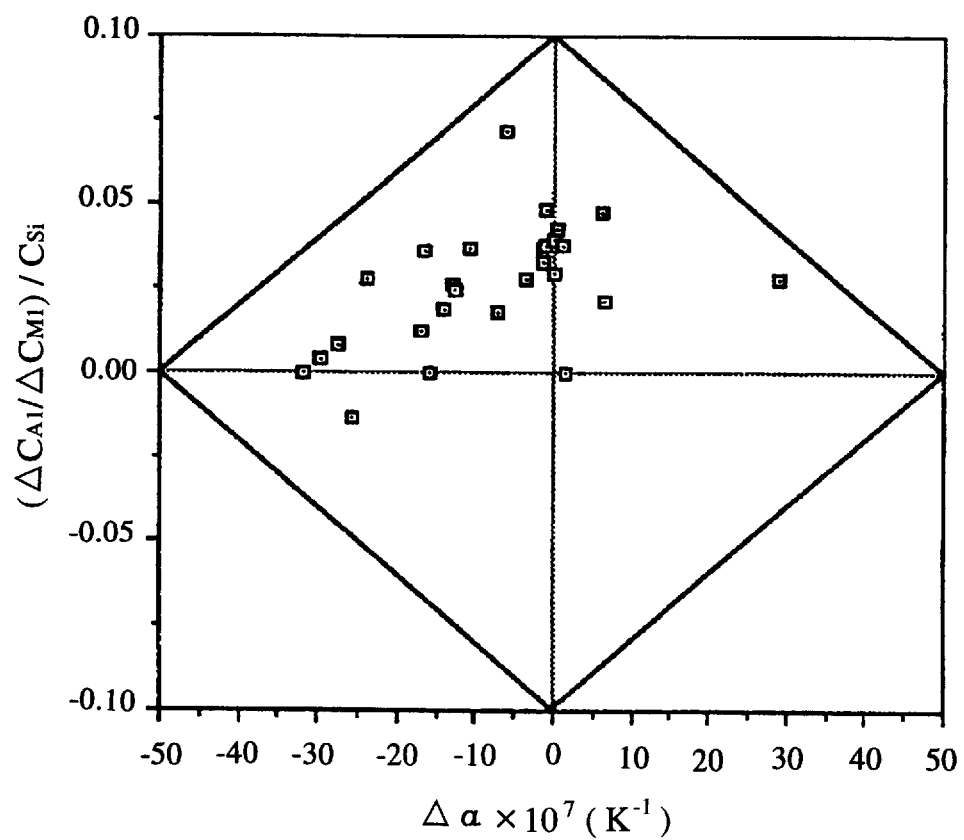
FIG. 6 is a view showing the relationship between $(\Delta C_{Al}/\Delta C_{Ml})/C_{Si}$ and difference in coefficient of thermal expansion $(\Delta \alpha)$ with respect to the glass bodies of Examples 44 to 71.

Tables 5 and 6 show the measurements of component ratios, refractive index, thermal expansion coefficient difference ($\Delta\alpha$), ($\Delta C_{Al}/\Delta C_{Ml})/C_{Si}$, etc. of each of the glass bodies of these Examples. With respect to each of the glass bodies of these Examples, the relationship between the thermal expansion coefficient difference ($\Delta\alpha$) and the ($\Delta C_{Al}/\Delta C_{Ml})/C_{Si}$ was graphed, thereby obtaining FIG. 6.

When X and Y were defined as $X=\Delta\alpha \times 10^7$ K and $Y=(\Delta C_{Al}/\Delta C_{Ml})/C_{Si}$ and satisfied the following relationships:

$$Y+0.1 \geq |(0.1/50) \cdot X| \quad (1),$$

and $$0.1-Y \geq |(0.1/50) \cdot X| \quad (2),$$

the cracking and breakage during the cooling step were prevented and an optical element having optical properties advantageous for correcting the chromatic aberration of an image pick-up system could be obtained.

EXAMPLES 72 TO 111

Each of the glass bodies of these Examples is composed of $SiO_2$—$Al_2O_3$—$M_{1a}O_b$—$M_{2c}O_d$, in which $M_{2c}O_d$, i.e., an oxide of a second metal species is distributed in the same direction as that of $M_{1a}O_b$, i.e., an oxide of a first metal species.

The glass body of Example 72 as a representative will be described as follows. In the glass body, $Y_2O_3$ is used as an oxide of a first metal species and $TiO_2$ as an oxide of a second metal species. $Y_2O_3$ has what appears to be a recessed concentration distribution being low at the center and high at the periphery of the glass body. Like $Y_2O_3$, $TiO_2$ also has what appears to be a recessed concentration distribution being low at the center and high at the periphery of the glass body.

Figure 7:
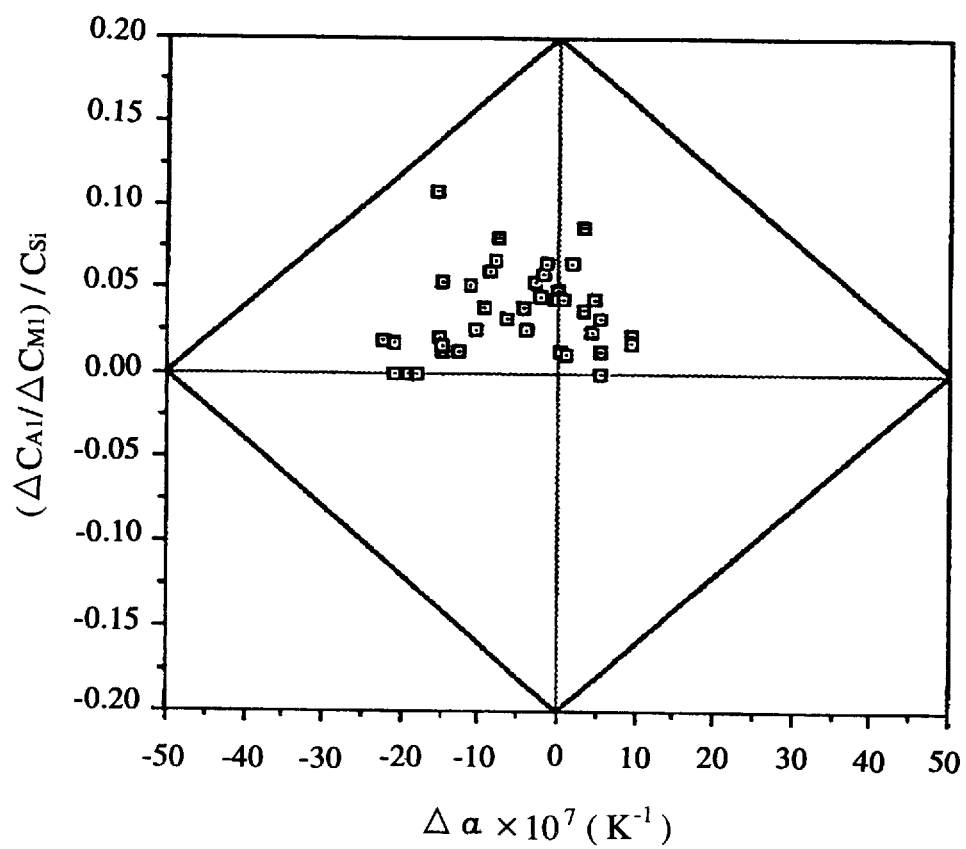
FIG. 7 is a view showing the relationship between $(\Delta C_{Al}/\Delta C_{Ml})/C_{Si}$ and difference in coefficient of thermal expansion $(\Delta \alpha)$ with respect to the glass bodies of Examples 72 to 111.

Tables 7 to 10 show the measurements of component ratios, refractive index, thermal expansion coefficient difference ($\Delta\alpha$), ($\Delta C_{Al}/\Delta C_{Ml})/C_{Si}$, etc. of each of the glass bodies of these Examples. With respect to each of the glass bodies of these Examples, the relationship between the thermal expansion coefficient difference ($\Delta\alpha$) and the ($\Delta C_{Al}/\Delta C_{Ml})/C_{Si}$ was graphed, thereby obtaining FIG. 7.

When X and Y were defined as $X=\Delta\alpha \times 10^7$ K and $Y=(\Delta C_{Al}/\Delta C_{Ml})/C_{Si}$ and satisfied the following relationships:

$$Y+0.2 \geq |(0.2/50) \cdot X| \quad (3),$$

and $$0.2-Y \geq |(0.2/50) \cdot X| \quad (4),$$

the cracking and breakage during the cooling step were prevented and an optical element having optical properties advantageous for correcting the chromatic aberration of an image pick-up system could be obtained.

In the above Examples 1 to 111, the glass bodies each having a substantially parabolic concentration distribution along the radial direction have been described. However, the metal distribution profile is by no means limited to the parabolic distribution profile, and any other distribution profile may be employed without any principal limitation. Moreover, regarding the optical properties, even when the refractive index distribution of the glass body is very slight or when the refractive index difference is nearly nil, the present invention can apply as long as the glass body has a distribution in dispersion characteristics. Further, the elements employed in combination with rare-earth elements such as La, Y and Gd are not limited to those mentioned in the Examples, and any components for facilitating the vitrification and for improving the resistances may be added as long as the addition is not detrimental to the effects of the present invention.

The glass bodies of the foregoing Examples can be produced in accordance with the procedure described in U.S. Pat. No. 5,171,344 to Noda which is herein incorporated by reference.

For example, the glass body of Example 3 was produced in the following manner.

76.61 g of $CH_3OH$ and 10.77 g of 2N HCl were added to 91.02 g of $Si(OCH_3)_4$ and agitated for 1 hr, thereby partially hydrolyzing the $Si(OCH_3)_4$. A solution obtained by dissolving 38.33 g of $Zr(OnC_4H_9)_4$ in 29.65 g of n-butanol was dropped in the resultant solution, and further 29.65 g of n-butanol, 9.88 g of N,N-dimethylformamide and 50.4 g of 0.3N $NH_4OH$ were dropped to thereby prepare a sol. This sol was poured in a polypropylene container of 18 mm in diameter, hermetically sealed and put in a 50° C. thermostat to thereby obtain a gel, which was aged as it was.

Subsequently, the gel was immersed in 3N $H_2SO_4$ to thereby provide the zirconium with a protrudent concentration distribution, washed with alcohol and dried to thereby obtain a dry gel.

The dry gel was immersed in ethanol to thereby fill the pores thereof with ethanol. The resultant gel was then immersed in a solution saturated with yttrium nitrate and aluminum nitrate for 2 hr to thereby provide recessed yttrium and aluminum concentration distributions. Thereafter, the gel was immersed in diethyl ether at 0° C. to thereby replace the solvent retained in the gel, so that microcrystals of yttrium nitrate and aluminum nitrate were formed on the inner wall of each of the gel pores with the result that the recessed concentration distributions were immobilized. The resultant gel was dried.

The thus produced dry gel had a protrudent concentration distribution with respect to zirconium and recessed concentration distributions with respect to yttrium and aluminum.

Finally, this dry gel was put in a tube furnace and fired to 980° C. As a result, a transparent glass body was obtained.

This glass body was subjected to composition analysis. The compositions in mol % were 59.83 $SiO_2$–8.55 $ZrO_2$ at the center of the glass body and 59.83 $SiO_2$–25.64 $Al_2O_3$–12.82 $Y_2O_3$–1.71 $ZrO_2$ at the periphery of the glass body, and it was confirmed that the glass body had a protrudent concentration distribution with respect to zirconium and recessed concentration distributions with respect to yttrium and aluminum.

TABLE 1

| | | Compsn. (mol %) | | 1st metal species | | 2nd metal species | | | | | | α | Δα | ΔCAl/ΔCM1 |
|---|---|---|---|---|---|---|---|---|---|---|---|---|---|---|
| | | SiO2 | Al2O3 | mol % | oxide | mol % | oxide | nd | Δnd | γd | Δγd | (*1E7(K)) | | /CSi |
| Example 1 | periphery | 46.10 | 0.00 | 3.80 | BaO | | | 1.4945 | −0.1155 | 64.3 | 8.3 | 27.1 | −43.9 | 0.0186 |
| | center | 46.10 | 23.10 | 30.80 | BaO | | | 1.6100 | | 56.0 | | 71.0 | | |
| Example 2 | periphery | 46.10 | 0.00 | 7.60 | BaO | | | 1.5248 | −0.0852 | 61.8 | 5.8 | 45.1 | −25.9 | 0.0216 |
| | center | 46.10 | 23.10 | 30.80 | BaO | | | 1.6100 | | 56.0 | | 71.0 | | |
| Example 3 | periphery | 59.83 | 25.64 | 12.82 | Y2O3 | 1.71 | ZrO2 | 1.5779 | 0.0300 | 53.8 | 1.0 | 32.0 | 24.0 | 0.0334 |
| | center | 59.83 | 0.00 | 0.00 | Y2O3 | 8.55 | ZrO2 | 1.5477 | | 52.8 | | 8.0 | | |
| Example 4 | periphery | 61.40 | 26.32 | 10.53 | Y2O3 | 1.75 | ZrO2 | 1.5674 | 0.1160 | 54.7 | 2.3 | 32.0 | 22.0 | 0.0136 |
| | center | 61.40 | 17.54 | 0.00 | Y2O3 | 8.77 | ZrO2 | 1.5558 | | 52.4 | | 10.0 | | |
| Example 5 | periphery | 61.40 | 26.32 | 10.53 | Y2O3 | 1.75 | ZrO2 | 1.5674 | −0.0230 | 54.7 | 7.0 | 34.0 | 21.0 | 0.0244 |
| | center | 61.40 | 10.53 | 0.00 | Y2O3 | 1.75 | ZrO2 | 1.5904 | | 47.7 | | 13.0 | | |
| Example 6 | periphery | 61.40 | 26.32 | 10.53 | Y2O3 | 1.75 | ZrO2 | 1.5674 | −0.0065 | 54.7 | 4.7 | 34.0 | 24.0 | 0.0271 |
| | center | 61.40 | 8.77 | 0.00 | Y2O3 | 13.16 | ZrO2 | 1.5739 | | 50.0 | | 10.0 | | |
| Example 7 | periphery | 61.40 | 26.32 | 10.53 | Y2O3 | 1.75 | ZrO2 | 1.5674 | 0.0362 | 54.7 | 0.0 | 32.0 | 24.0 | 0.0407 |
| | center | 61.40 | 0.00 | 0.00 | Y2O3 | 7.02 | ZrO2 | 1.5313 | | 54.7 | | 8.0 | | |
| Example 8 | periphery | 56.86 | 22.55 | 7.84 | Y2O3 | 12.75 | TiO2 | 1.6294 | 0.0003 | 40.6 | 4.9 | 28.7 | −1.1 | 0.0528 |
| | center | 56.86 | 4.90 | 1.96 | Y2O3 | 14.71 | TiO2 | 1.6290 | | 35.7 | | 29.8 | | |
| Example 9 | periphery | 69.05 | 5.95 | 9.52 | Y2O3 | 15.48 | TiO2 | 1.6294 | 0.0073 | 40.6 | 3.9 | 28.7 | 1.0 | −0.0121 |
| | center | 69.05 | 11.90 | 2.38 | Y2O3 | 17.86 | TiO2 | 1.6221 | | 36.6 | | 27.7 | | |
| Example 10 | periphery | 56.86 | 22.55 | 7.84 | Y2O3 | 12.75 | TiO2 | 1.6294 | 0.0073 | 40.6 | 3.2 | 28.7 | 4.2 | 0.0234 |
| | center | 56.86 | 14.71 | 1.96 | Y2O3 | 14.71 | TiO2 | 1.6221 | | 37.4 | | 24.5 | | |
| Example 11 | periphery | 56.86 | 22.55 | 7.84 | Y2O3 | 12.75 | TiO2 | 1.6294 | 0.0073 | 40.6 | 2.4 | 28.7 | 7.4 | 0.0088 |
| | center | 56.86 | 19.61 | 1.96 | Y2O3 | 14.71 | TiO2 | 1.6088 | | 38.2 | | 21.3 | | |
| Example 12 | periphery | 53.21 | 27.52 | 7.34 | Y2O3 | 11.93 | TiO2 | 1.6218 | 0.0236 | 41.4 | 1.9 | 24.5 | 8.5 | 0.0000 |
| | center | 53.21 | 27.52 | 1.83 | Y2O3 | 13.76 | TiO2 | 1.5982 | | 39.5 | | 16.0 | | |

TABLE 2

| | | Compsn. (mol %) | | 1st metal species | | 2nd metal species | | | | | | α | Δα | ΔCAl/ΔCM1 |
|---|---|---|---|---|---|---|---|---|---|---|---|---|---|---|
| | | SiO2 | Al2O3 | mol % | oxide | mol % | oxide | nd | Δnd | γd | Δγd | (*1E7(K)) | | /CSi |
| Example 13 | periphery | 53.21 | 27.52 | 7.34 | Y2O3 | 11.93 | TiO2 | 1.6213 | 0.0011 | 41.4 | 7.1 | 24.5 | 4.4 | 0.0705 |
| | center | 53.21 | 0.00 | 0.00 | Y2O3 | 13.76 | TiO2 | 1.6202 | | 34.3 | | 20.1 | | |
| Example 14 | periphery | 59.79 | 18.56 | 8.25 | Y2O3 | 13.40 | TiO2 | 1.6361 | 0.0159 | 40.0 | 5.6 | 31.9 | 11.8 | 0.0376 |
| | center | 59.79 | 0.00 | 0.00 | Y2O3 | 15.46 | TiO2 | 1.6202 | | 34.3 | | 20.1 | | |
| Example 15 | periphery | 64.49 | 18.69 | 0.00 | Y2O3 | 2.80 | TiO2 | 1.5000 | −0.0463 | 57.8 | −3.1 | 14.9 | −13.8 | 0.0194 |
| | center | 64.49 | 28.04 | 7.48 | Y2O3 | 0.00 | TiO2 | 1.5463 | | 60.8 | | 28.7 | | |
| Example 16 | periphery | 64.49 | 28.04 | 0.00 | Y2O3 | 2.80 | TiO2 | 1.5043 | −0.0420 | 58.4 | −2.5 | 14.9 | −13.8 | 0.0000 |
| | center | 64.49 | 28.04 | 7.48 | Y2O3 | 0.00 | TiO2 | 1.5463 | | 60.8 | | 28.7 | | |
| Example 17 | periphery | 60.53 | 0.00 | 0.00 | Y2O3 | 6.14 | TiO2 | 1.5210 | −0.0691 | 46.0 | −11.5 | 12.8 | −25.5 | 0.0330 |
| | center | 60.53 | 26.32 | 13.16 | Y2O3 | 0.00 | TiO2 | 1.5901 | | 57.5 | | 38.3 | | |
| Example 18 | periphery | 60.53 | 13.16 | 13.16 | Y2O3 | 6.14 | TiO2 | 1.5254 | −0.0648 | 48.6 | −8.8 | 16.0 | −22.3 | 0.0165 |
| | center | 60.53 | 26.32 | 13.16 | Y2O3 | 0.00 | TiO2 | 1.5901 | | 57.5 | | 38.3 | | |
| Example 19 | periphery | 60.53 | 26.32 | 0.00 | Y2O3 | 6.14 | TiO2 | 1.5268 | −0.0634 | 50.4 | −7.0 | 14.9 | −23.4 | 0.0000 |
| | center | 60.53 | 26.32 | 13.16 | Y2O3 | 0.00 | TiO2 | 1.5901 | | 57.5 | | 38.3 | | |
| Example 20 | periphery | 66.67 | 25.00 | 0.00 | La2O3 | 4.17 | TiO2 | 1.5106 | −0.0669 | 55.1 | −2.6 | 15.4 | −18.6 | 0.0000 |
| | center | 66.67 | 25.00 | 8.33 | La2O3 | 0.00 | TiO2 | 1.5775 | | 57.8 | | 34.0 | | |
| Example 21 | periphery | 66.93 | 0.00 | 1.57 | Y2O3 | 4.72 | PbO | 1.5193 | −0.0377 | 53.6 | −4.4 | 24.8 | −8.2 | 0.0560 |
| | center | 66.93 | 23.62 | 7.87 | Y2O3 | 1.57 | PbO | 1.5569 | | 58.0 | | 33.0 | | |
| Example 22 | periphery | 65.42 | 9.35 | 15.89 | Y2O3 | 9.35 | PbO | 1.6702 | −0.0117 | 43.9 | 6.7 | 63.8 | 2.1 | 0.0000 |
| | center | 65.42 | 9.35 | 9.35 | Y2O3 | 18.69 | PbO | 1.6819 | | 37.2 | | 61.7 | | |
| Example 23 | periphery | 55.12 | 23.62 | 13.39 | Y2O3 | 7.87 | PbO | 1.6444 | −0.0082 | 46.1 | 6.2 | 47.8 | 1.0 | 0.0000 |
| | center | 55.12 | 23.62 | 7.87 | Y2O3 | 15.75 | PbO | 1.6526 | | 39.9 | | 46.8 | | |

TABLE 3

| | | Compsn. (mol %) | | 1st metal species | | 2nd metal species | | 1st metal species | | | | | | α | Δα | ΔCAl/ΔCM1 |
|---|---|---|---|---|---|---|---|---|---|---|---|---|---|---|---|---|
| | | SiO2 | Al2O3 | mol % | oxide | mol % | oxide | mol % | oxide | nd | Δnd | γd | Δγd | (*1E7(K)) | | /CSi |
| Example 24 | periphery | 57.83 | 0.00 | 0.00 | CaO | 3.61 | PbO | | | 1.4963 | −0.0461 | 56.0 | −3.0 | 17.9 | −20.4 | 0.0236 |
| | center | 57.83 | 18.07 | 13.25 | CaO | 10.84 | ZnO | | | 1.5424 | | 59.0 | | 38.3 | | |
| Example 25 | periphery | 57.83 | 18.07 | 0.00 | CaO | 3.61 | PbO | | | 1.5091 | −0.0333 | 58.3 | −0.7 | 21.3 | −17.0 | 0.0000 |
| | center | 57.83 | 18.07 | 13.25 | CaO | 10.84 | ZnO | | | 1.5424 | | 59.0 | | 38.3 | | |

TABLE 3-continued

| | | Compsn. (mol %) | | 1st metal species | | 2nd metal species | | 1st metal species | | nd | Δnd | γd | Δγd | α (*1E7(K)) | Δα | ΔCAl/ΔCMl/CSi |
|---|---|---|---|---|---|---|---|---|---|---|---|---|---|---|---|---|
| | | SiO2 | Al2O3 | mol % | oxide | mol % | oxide | mol % | oxide | | | | | | | |
| Example 26 | periphery | 55.56 | 18.52 | 0.00 | CaO | 7.41 | PbO | 0.00 | SrO | 1.5395 | −0.0093 | 50.8 | −7.7 | 28.7 | −11.7 | 0.0000 |
| | center | 55.56 | 18.52 | 12.35 | CaO | 10.49 | ZnO | 3.09 | SrO | 1.5487 | | 58.5 | | 40.4 | | |
| Example 27 | periphery | 55.56 | 0.00 | 0.00 | CaO | 6.17 | PbO | 0.00 | SrO | 1.5254 | −0.0234 | 49.4 | −9.1 | 26.5 | −13.9 | 0.0270 |
| | center | 55.56 | 18.52 | 12.35 | CaO | 10.49 | ZnO | 3.09 | SrO | 1.5487 | | 58.5 | | 40.4 | | |
| Example 28 | periphery | 55.56 | 18.52 | 0.00 | CaO | 6.17 | PbO | 0.00 | SrO | 1.5301 | −0.0186 | 52.9 | −5.5 | 26.6 | −13.8 | 0.0000 |
| | center | 55.56 | 18.52 | 12.35 | CaO | 10.49 | ZnO | 3.09 | SrO | 1.5487 | | 58.5 | | 40.4 | | |

TABLE 4

| | | Compsn. (mol %) | | 1st metal species | | 2nd metal species | | nd | Δnd | γd | Δγd | α (*1E7(K)) | Δα | ΔCAl/ΔCM1/CSi |
|---|---|---|---|---|---|---|---|---|---|---|---|---|---|---|
| | | SiO2 | Al2O3 | mol % | oxide | mol % | oxide | | | | | | | |
| Example 29 | periphery | 61.78 | 19.11 | 0.00 | | 3.82 | PbO | 1.5406 | 0.0319 | 60.7 | 2.3 | 47.9 | 26.6 | 0.0000 |
| | center | 61.78 | 19.11 | 19.11 | SrO | 0.00 | | 1.5087 | | 58.3 | | 21.3 | | |
| Example 30 | periphery | 65.99 | 20.41 | 13.61 | SrO | 0.00 | | 1.5246 | 0.0474 | 62.4 | 0.9 | 40.4 | 28.7 | 0.0227 |
| | center | 65.99 | 0.00 | 0.00 | | 2.04 | PbO | 1.4773 | | 61.5 | | 11.7 | | |
| Example 31 | periphery | 65.99 | 20.41 | 13.61 | SrO | 0.00 | | 1.5248 | 0.0295 | 62.4 | −0.1 | 40.4 | 23.4 | 0.0000 |
| | center | 65.99 | 20.41 | 0.00 | | 2.04 | PbO | 1.4954 | | 62.5 | | 17.0 | | |
| Example 32 | periphery | 62.96 | 22.22 | 11.11 | BaO | 3.70 | 5PbO | 1.5533 | 0.0016 | 55.0 | 7.5 | 43.4 | 3.4 | 0.0476 |
| | center | 62.96 | 0.00 | 3.70 | BaO | 7.41 | 10PbO | 1.5517 | | 47.5 | | 40.0 | | |
| Example 33 | periphery | 62.96 | 22.22 | 11.11 | BaO | 3.70 | 5PbO | 1.5533 | 0.0048 | 55.1 | 3.8 | 43.4 | 8.7 | 0.0000 |
| | center | 62.96 | 22.22 | 3.70 | BaO | 7.41 | 10PbO | 1.5485 | | 51.3 | | 34.7 | | |
| Example 34 | periphery | 56.45 | 8.06 | 4.03 | BaO | 4.03 | Ta2O5 | 1.5686 | −0.0234 | 52.1 | −1.5 | 31.3 | −15.7 | 0.0236 |
| | center | 56.45 | 24.19 | 16.13 | BaO | 3.23 | Ta2O5 | 1.5920 | | 53.6 | | 47.0 | | |
| Example 35 | periphery | 56.45 | 16.13 | 4.03 | BaO | 4.84 | Ta2O5 | 1.5831 | −0.0115 | 43.0 | −5.3 | 13.3 | −24.1 | 0.0118 |
| | center | 56.45 | 24.19 | 16.13 | BaO | 3.23 | Ta2O5 | 1.5946 | | 48.3 | | 37.4 | | |
| Example 36 | periphery | 55.56 | 7.94 | 3.97 | BaO | 7.94 | TiO2 | 1.5649 | −0.0123 | 43.9 | −6.9 | 30.0 | −14.0 | 0.0240 |
| | center | 55.56 | 23.81 | 15.87 | BaO | 4.76 | TiO2 | 1.5773 | | 50.8 | | 44.0 | | |
| Example 37 | periphery | 60.34 | 8.62 | 4.31 | BaO | 6.90 | TiO2 | 1.5511 | −0.0314 | 46.5 | −3.6 | 29.1 | −21.8 | 0.0110 |
| | center | 60.34 | 17.24 | 17.24 | BaO | 5.17 | TiO2 | 1.5824 | | 50.1 | | 50.9 | | |
| Example 38 | periphery | 60.00 | 20.00 | 3.00 | Y2O3 | 7.00 | Ta2O5 | 1.6096 | −0.0184 | 48.7 | −1.7 | 27.8 | −7.2 | 0.0119 |
| | center | 60.00 | 25.00 | 10.00 | Y2O3 | 5.00 | Ta2O5 | 1.6280 | | 50.3 | | 35.0 | | |
| Example 39 | periphery | 60.87 | 21.74 | 0.00 | | 6.09 | TiO2 | 1.5262 | −0.1034 | 50.1 | −4.2 | 16.0 | −24.0 | 0.0055 |
| | center | 60.87 | 26.09 | 13.04 | La2O3 | 0.00 | TiO2 | 1.6296 | | 54.2 | | 40.0 | | |
| Example 40 | periphery | 53.10 | 13.27 | 1.77 | La2O3 | 13.27 | TiO2 | 1.6183 | −0.0392 | 37.7 | −3.3 | 25.5 | −3.3 | 0.0353 |
| | center | 53.10 | 26.55 | 8.85 | La2O3 | 11.50 | TiO2 | 1.6575 | | 41.0 | | 28.8 | | |
| Example 41 | periphery | 55.56 | 18.52 | 4.63 | La2O3 | 4.63 | Nb2O5 | 1.6206 | −0.0564 | 42.8 | −3.4 | 15.1 | −17.2 | 0.0180 |
| | center | 55.56 | 27.78 | 13.89 | La2O3 | 2.78 | Nb2O5 | 1.6769 | | 46.1 | | 32.3 | | |
| Example 42 | periphery | 60.87 | 17.39 | 0.00 | | 3.48 | Nb2O5 | 1.5390 | −0.0501 | 47.6 | −10.0 | 4.9 | −33.0 | 0.0110 |
| | center | 60.87 | 26.09 | 13.04 | Y2O3 | 0.00 | Nb2O5 | 1.5891 | | 57.5 | | 37.9 | | |
| Example 43 | periphery | 50.85 | 4.24 | 4.24 | La2O3 | 8.47 | Ta2O5 | 1.7014 | −0.0564 | 42.8 | −1.9 | 39.4 | −8.3 | 0.0328 |
| | center | 50.85 | 25.42 | 16.95 | La2O3 | 6.78 | Ta2O5 | 1.7578 | | 44.8 | | 47.7 | | |

TABLE 5

| | | Compsn. (mol %) | | 1st metal species | | 2nd metal species | | nd | Δnd | γd | Δγd | α (*1E7(K)) | Δα | ΔCAl/ΔCm1/CSi |
|---|---|---|---|---|---|---|---|---|---|---|---|---|---|---|
| | | SiO2 | Al2O3 | mol % | oxide | mol % | oxide | | | | | | | |
| Example 44 | periphery | 48.00 | 0.00 | 8.00 | Y2O3 | 15.00 | Ta2O5 | 1.8305 | 0.0011 | 37.9 | −2.3 | 57.1 | 0.1 | 0.0295 |
| | center | 48.00 | 17.00 | 20.00 | Y2O3 | 15.00 | Ta2O5 | 1.8294 | | 40.3 | | 57.0 | | |
| Example 45 | periphery | 46.60 | 9.71 | 7.77 | Y2O3 | 14.56 | Ta2O5 | 1.7924 | −0.0280 | 39.2 | −1.4 | 46.0 | −7.2 | 0.0179 |
| | center | 46.60 | 19.42 | 19.42 | Y2O3 | 14.56 | Ta2O5 | 1.8204 | | 40.5 | | 53.2 | | |
| Example 46 | periphery | 44.44 | 4.63 | 7.41 | Y2O3 | 13.89 | Ta2O5 | 1.8103 | 0.0038 | 38.6 | −2.4 | 51.0 | 1.2 | 0.0375 |
| | center | 44.44 | 23.15 | 18.52 | Y2O3 | 13.89 | Ta2O5 | 1.8065 | | 41.0 | | 49.8 | | |
| Example 47 | periphery | 50.53 | 0.00 | 8.42 | Y2O3 | 10.53 | Ta2O5 | 1.7597 | −0.0217 | 41.0 | −2.0 | 53.7 | −3.7 | 0.0280 |
| | center | 50.53 | 17.89 | 21.05 | Y2O3 | 10.53 | Ta2O5 | 1.7815 | | 43.0 | | 57.4 | | |
| Example 48 | periphery | 44.44 | 9.26 | 9.26 | Y2O3 | 9.26 | Ta2O5 | 1.7300 | −0.0200 | 42.4 | −1.7 | 44.7 | −1.0 | 0.0375 |
| | center | 44.44 | 27.78 | 18.52 | Y2O3 | 9.26 | Ta2O5 | 1.7500 | | 44.0 | | 45.7 | | |
| Example 49 | periphery | 64.09 | 11.05 | 13.81 | La2O3 | 11.05 | TiO2 | 1.6664 | 0.0550 | 42.9 | 1.7 | 32.3 | 1.4 | 0.0000 |
| | center | 64.09 | 11.05 | 4.42 | La2O3 | 11.05 | TiO2 | 1.6115 | | 41.2 | | 30.9 | | |
| Example 50 | periphery | 50.66 | 23.58 | 10.92 | La2O3 | 14.85 | TiO2 | 1.7051 | 0.0391 | 37.9 | 2.5 | 33.0 | 0.0 | 0.0395 |
| | center | 50.66 | 8.73 | 3.49 | La2O3 | 14.85 | TiO2 | 1.6660 | | 35.3 | | 33.0 | | |

TABLE 5-continued

| | | Compsn. (mol %) | | 1st metal species | | 2nd metal species | | nd | Δnd | γd | Δγd | α α (*1E7(K)) | Δα Δα | ΔCAl /ΔCm1 /CSi |
|---|---|---|---|---|---|---|---|---|---|---|---|---|---|---|
| | | SiO2 | Al2O3 | mol % | oxide | mol % | oxide | | | | | | | |
| Example 51 | periphery | 52.97 | 20.09 | 11.42 | La2O3 | 15.53 | TiO2 | 1.7143 | 0.0270 | 37.3 | 3.7 | 37.2 | −1.0 | 0.0489 |
| | center | 52.97 | 0.00 | 3.65 | La2O3 | 15.53 | TiO2 | 1.6874 | | 33.7 | | 38.2 | | |
| Example 52 | periphery | 56.59 | 14.63 | 12.20 | La2O3 | 16.59 | TiO2 | 1.7295 | 0.0532 | 36.6 | 2.0 | 42.6 | 6.4 | 0.0208 |
| | center | 56.59 | 4.88 | 3.90 | La2O3 | 16.59 | TiO2 | 1.6763 | | 34.5 | | 36.2 | | |
| Example 53 | periphery | 49.36 | 25.53 | 10.64 | La2O3 | 14.47 | T1O2 | 1.6991 | 0.0118 | 38.1 | 4.5 | 31.9 | −6.3 | 0.0715 |
| | center | 49.36 | 0.00 | 3.40 | La2O3 | 14.47 | TiO2 | 1.6874 | | 33.7 | | 38.2 | | |
| Example 54 | periphery | 53.95 | 4.65 | 3.72 | La2O3 | 15.81 | TiO2 | 1.6763 | −0.0424 | 34.5 | −2.6 | 37.2 | −1.5 | 0.0327 |
| | center | 53.95 | 18.60 | 11.63 | La2O3 | 15.81 | TiO2 | 1.7187 | | 37.1 | | 38.7 | | |
| Example 55 | periphery | 49.36 | 8.51 | 3.40 | La2O3 | 14.47 | TiO2 | 1.6660 | −0.0338 | 35.3 | −2.8 | 38.2 | 6.3 | 0.0477 |
| | center | 49.36 | 25.53 | 10.64 | La2O3 | 14.47 | TiO2 | 1.6999 | | 38.2 | | 31.9 | | |
| Example 56 | periphery | 66.04 | 9.43 | 4.72 | BaO | 5.66 | TiO2 | 1.5373 | −0.0399 | 49.7 | −1.1 | 28.7 | −16.0 | 0.0000 |
| | center | 66.04 | 9.43 | 18.87 | BaO | 5.66 | TiO2 | 1.5773 | | 50.8 | | 44.7 | | |
| Example 57 | periphery | 59.32 | 8.47 | 25.42 | BaO | 6.78 | TiO2 | 1.5511 | −0.0556 | 46.5 | −1.8 | 29.6 | −25.7 | −0.0135 |
| | center | 59.32 | 25.42 | 4.24 | BaO | 6.78 | TiO2 | 1.6066 | | 48.3 | | 55.3 | | |

TABLE 6

| | | Compsn. (mol %) | | 1st metal species | | 2nd metal species | | nd | Δnd | γd | Δγd | α (*1E7(K)) | Δα | ΔCAl /ΔCM1 /CSi |
|---|---|---|---|---|---|---|---|---|---|---|---|---|---|---|
| | | SiO2 | Al2O3 | mol % | oxide | mol % | oxide | | | | | | | |
| Example 58 | periphery | 50.72 | 14.49 | 3.62 | Bao | 5.80 | TiO2 | 1.5499 | −0.0567 | 47.9 | −0.4 | 27.7 | −27.6 | 0.0079 |
| | center | 50.72 | 21.74 | 21.74 | BaO | 5.80 | TiO2 | 1.6066 | | 48.3 | | 55.3 | | |
| Example 59 | periphery | 50.72 | 18.12 | 3.62 | BaO | 5.80 | TiO2 | 1.5485 | −0.0581 | 48.4 | 0.1 | 25.5 | −29.8 | 0.0039 |
| | center | 50.72 | 21.74 | 21.74 | BaO | 5.80 | TiO2 | 1.6066 | | 48.3 | | 55.3 | | |
| Example 60 | periphery | 50.72 | 21.74 | 3.62 | BaO | 5.80 | TiO2 | 1.5471 | −0.0596 | 48.9 | 0.5 | 23.4 | −31.9 | 0.0000 |
| | center | 50.72 | 21.74 | 21.74 | BaO | 5.80 | TiO2 | 1.6066 | | 48.3 | | 55.3 | | |
| Example 61 | periphery | 54.69 | 7.81 | 3.91 | BaO | 6.25 | TiO2 | 1.5511 | −0.0345 | 46.5 | −1.9 | 29.8 | −12.8 | 0.0244 |
| | center | 54.69 | 23.44 | 15.63 | BaO | 6.25 | TiO2 | 1.5856 | | 48.5 | | 42.6 | | |
| Example 62 | periphery | 53.03 | 15.15 | 3.79 | BaO | 9.09 | TiO2 | 1.5738 | −0.0288 | 43.1 | −1.6 | | | 0.0126 |
| | center | 53.03 | 22.73 | 15.15 | BaO | 9.09 | TiO2 | 1.6026 | | 44.6 | | | | |
| Example 63 | periphery | 55.56 | 0.00 | 3.97 | BaO | 4.76 | TiO2 | 1.5360 | −0.0413 | 48.2 | −2.6 | 28.0 | −16.7 | 0.0360 |
| | center | 55.56 | 23.81 | 15.87 | BaO | 4.76 | TiO2 | 1.5773 | | 50.8 | | 44.7 | | |
| Example 64 | periphery | 55.56 | 15.87 | 3.97 | BaO | 4.76 | TiO2 | 1.5379 | −0.0394 | 51.0 | 0.1 | 27.7 | −17.0 | 0.0120 |
| | center | 55.56 | 23.81 | 15.87 | BaO | 4.76 | TiO2 | 1.5773 | | 50.8 | | 44.7 | | |
| Example 65 | periphery | 53.85 | 0.00 | 0.00 | BaO | 11.54 | PbO | 1.5848 | −0.0274 | 40.1 | −3.2 | 41.6 | −11.0 | 0.0371 |
| | center | 53.85 | 23.08 | 11.54 | BaO | 11.54 | PbO | 1.6123 | | 43.3 | | 52.6 | | |
| Example 66 | periphery | 53.85 | 11.54 | 0.00 | BaO | 11.54 | PbO | 1.5768 | −0.0355 | 43.1 | −0.2 | 38.3 | −14.3 | 0.0186 |
| | center | 53.85 | 23.08 | 11.54 | BaO | 11.54 | PbO | 1.6123 | | 43.3 | | 52.6 | | |
| Example 67 | periphery | 54.69 | 0.00 | 3.91 | BaO | 2.34 | Nb2O5 | 1.5425 | −0.0537 | 47.9 | −2.4 | 46.3 | 29.1 | 0.0274 |
| | center | 54.69 | 23.44 | 19.53 | BaO | 2.34 | Nb2O5 | 1.5962 | | 50.3 | | 17.2 | | |
| Example 68 | periphery | 54.69 | 0.00 | 3.91 | BaO | 2.34 | Nb2O5 | 1.5754 | −0.0396 | 42.0 | −4.2 | 27.3 | −23.8 | 0.0274 |
| | center | 54.69 | 23.44 | 19.53 | BaO | 2.34 | Nb2O5 | 1.6150 | | 46.3 | | 51.1 | | |
| Example 69 | periphery | 54.79 | 0.00 | 3.65 | Y2O3 | 15.53 | TiO2 | 1.6654 | −0.0131 | 34.1 | −3.8 | 37.4 | 0.3 | 0.0429 |
| | center | 54.79 | 18.26 | 11.42 | Y2O3 | 15.53 | TiO2 | 1.6784 | | 37.9 | | 37.1 | | |
| Example 70 | periphery | 45.45 | 9.09 | 9.09 | La2O3 | 9.09 | Ta2O5 | 1.7553 | −0.0461 | 41.9 | −0.9 | 47.1 | −1.6 | 0.0367 |
| | center | 45.45 | 27.27 | 18.18 | La2O3 | 9.09 | Ta2O5 | 1.8014 | | 42.7 | | 48.7 | | |
| Example 71 | periphery | 51.72 | 8.62 | 4.31 | BaO | 5.17 | Ta2O5 | 1.5966 | −0.0253 | 49.3 | −1.0 | 34.9 | −12.9 | 0.0258 |
| | center | 51.72 | 25.86 | 17.24 | BaO | 5.17 | Ta2O5 | 1.6219 | | 50.3 | | 47.8 | | |

TABLE 7

| | | Compsn. (mol %) | | 1st metal species | | 2nd metal species | | nd | Δnd | γd | Δγd | α (*1E7(K)) | Δα | ΔCAl /ΔCM1 /CSi |
|---|---|---|---|---|---|---|---|---|---|---|---|---|---|---|
| | | SiO2 | Al2O3 | mol % | oxide | mol % | oxide | | | | | | | |
| Example 72 | periphery | 51.79 | 16.07 | 7.14 | Y2O3 | 25.00 | TiO2 | 1.7315 | 0.0173 | 31.8 | 2.6 | 34.7 | 0.6 | 0.0434 |
| | center | 51.79 | 0.00 | 0.00 | Y2O3 | 23.21 | TiO2 | 1.7142 | | 29.2 | | 34.1 | | |
| Example 73 | periphery | 53.21 | 13.76 | 7.34 | Y2O3 | 25.69 | TiO2 | 1.7379 | 0.0340 | 31.5 | 1.7 | 36.2 | 4.3 | 0.0235 |
| | center | 53.21 | 4.59 | 0.00 | Y2O3 | 23.85 | TiO2 | 1.7039 | | 29.9 | | 31.9 | | |
| Example 74 | periphery | 46.77 | 24.19 | 6.45 | Y2O3 | 22.58 | TiO2 | 1.7056 | 0.0038 | 33.1 | 3.9 | 26.6 | −7.5 | 0.0802 |
| | center | 46.77 | 0.00 | 0.00 | Y2O3 | 20.97 | TiO2 | 1.7142 | | 29.2 | | 34.1 | | |
| Example 75 | periphery | 53.85 | 15.38 | 0.00 | Y2O3 | 9.23 | TiO2 | 1.5589 | −0.0910 | 42.7 | 1.3 | 19.1 | −14.9 | 0.0124 |
| | center | 53.85 | 23.08 | 11.54 | Y2O3 | 11.54 | TiO2 | 1.6499 | | 41.4 | | 34.0 | | |
| Example 76 | periphery | 55.12 | 23.62 | 0.00 | Y2O3 | 9.45 | TiO2 | 1.5548 | −0.0951 | 44.0 | 2.6 | 14.9 | −19.1 | 0.0000 |
| | center | 55.12 | 23.62 | 11.81 | Y2O3 | 9.45 | TiO2 | 1.6499 | | 41.4 | | 34.0 | | |

TABLE 7-continued

| | | Compsn. (mol %) | | 1st metal species | | 2nd metal species | | nd | Δnd | γd | Δγd | α (*1E7(K)) | Δα | ΔCA1/ΔCM1/CSi |
|---|---|---|---|---|---|---|---|---|---|---|---|---|---|---|
| | | SiO2 | Al2O3 | mol % | oxide | mol % | oxide | | | | | | | |
| Example 77 | periphery | 51.85 | 0.00 | 0.00 | Y2O3 | 13.33 | TiO2 | 1.6192 | −0.0527 | 34.4 | −4.1 | 24.5 | −9.5 | 0.0386 |
| | center | 51.85 | 22.22 | 11.11 | Y2O3 | 14.81 | TiO2 | 1.6720 | | 38.4 | | 34.0 | | |
| Example 78 | periphery | 51.85 | 7.41 | 0.00 | Y2O3 | 13.33 | TiO2 | 1.6082 | −0.0638 | 36.1 | −2.4 | 23.4 | −10.6 | 0.0257 |
| | center | 51.85 | 22.22 | 11.11 | Y2O3 | 14.81 | TiO2 | 1.6720 | | 38.4 | | 34.0 | | |
| Example 79 | periphery | 51.85 | 14.81 | 0.00 | Y2O3 | 13.33 | TiO2 | 1.5986 | −0.0733 | 37.5 | −0.9 | 21.3 | −12.7 | 0.0129 |
| | center | 51.85 | 22.22 | 11.11 | Y2O3 | 14.81 | TiO2 | 1.6720 | | 38.4 | | 34.0 | | |
| Example 80 | periphery | 51.85 | 22.22 | 0.00 | Y2O3 | 13.33 | TiO2 | 1.5898 | −0.0822 | 38.8 | 0.3 | 16.0 | −18.0 | 0.0000 |
| | center | 51.85 | 22.22 | 11.11 | Y2O3 | 14.81 | TiO2 | 1.6720 | | 38.4 | | 34.0 | | |

TABLE 8

| | | Compsn. (mol %) | | 1st metal species | | 2nd metal species | | nd | Δnd | γd | Δγd | α (*1E7(K)) | Δα | ΔCA1/ΔCM1/CSi |
|---|---|---|---|---|---|---|---|---|---|---|---|---|---|---|
| | | SiO2 | Al2O3 | mol % | oxide | mol % | oxide | | | | | | | |
| Example 81 | periphery | 50.00 | 0.00 | 1.32 | La2O3 | 15.79 | TiO2 | 1.6726 | −0.0269 | 32.5 | −2.3 | 33.0 | −15.4 | 0.1091 |
| | center | 50.00 | 26.32 | 6.14 | La2O3 | 17.54 | TiO2 | 1.6995 | | 34.8 | | 48.4 | | |
| Example 82 | periphery | 55.88 | 9.80 | 1.47 | La2O3 | 17.65 | TiO2 | 1.6517 | −0.0477 | 34.2 | −0.6 | 29.1 | −3.9 | 0.0260 |
| | center | 55.88 | 17.65 | 6.86 | La2O3 | 19.61 | TiO2 | 1.6995 | | 34.8 | | 33.0 | | |
| Example 83 | periphery | 54.81 | 4.81 | 0.00 | La2O3 | 7.69 | TiO2 | 1.5673 | −0.0541 | 42.8 | −0.6 | 22.1 | −1.5 | 0.0652 |
| | center | 54.81 | 28.85 | 6.73 | La2O3 | 9.62 | TiO2 | 1.6214 | | 43.4 | | 23.6 | | |
| Example 84 | periphery | 61.96 | 0.00 | 1.63 | La2O3 | 8.70 | TiO2 | 1.5693 | −0.0667 | 41.7 | −0.3 | 21.3 | −11.3 | 0.0528 |
| | center | 61.96 | 19.57 | 7.61 | La2O3 | 10.87 | TiO2 | 1.6360 | | 42.0 | | 32.6 | | |
| Example 85 | periphery | 54.81 | 15.38 | 1.44 | La2O3 | 7.69 | TiO2 | 1.5632 | −0.0582 | 44.9 | 1.5 | 21.3 | −2.3 | 0.0464 |
| | center | 54.81 | 28.85 | 6.73 | La2O3 | 9.62 | TiO2 | 1.6214 | | 43.4 | | 23.6 | | |
| Example 86 | periphery | 52.29 | 14.68 | 1.38 | La2O3 | 11.93 | TiO2 | 1.6021 | −0.0468 | 39.0 | −0.2 | 23.4 | 0.0 | 0.0487 |
| | center | 52.29 | 27.52 | 6.42 | La2O3 | 13.76 | TiO2 | 1.6489 | | 39.2 | | 23.4 | | |
| Example 87 | periphery | 52.29 | 4.59 | 1.38 | La2O3 | 11.93 | TiO2 | 1.6147 | −0.0342 | 37.0 | −2.2 | 26.6 | 3.2 | 0.0869 |
| | center | 52.29 | 27.52 | 6.42 | La2O3 | 13.76 | TiO2 | 1.6489 | | 39.2 | | 23.4 | | |
| Example 88 | periphery | 46.72 | 4.10 | 1.23 | La2O3 | 14.75 | TiO2 | 1.6616 | −0.0720 | 33.4 | −3.2 | 31.7 | −4.5 | 0.0396 |
| | center | 46.72 | 24.59 | 12.30 | La2O3 | 16.39 | TiO2 | 1.7336 | | 36.6 | | 36.2 | | |
| Example 89 | periphery | 46.72 | 8.20 | 1.23 | La2O3 | 14.75 | TiO2 | 1.6517 | −0.0819 | 34.2 | −2.4 | 29.8 | −6.4 | 0.0317 |
| | center | 46.72 | 24.59 | 12.30 | La2O3 | 16.39 | TiO2 | 1.7336 | | 36.6 | | 36.2 | | |
| Example 90 | periphery | 46.72 | 16.39 | 1.23 | La2O3 | 14.75 | TiO2 | 1.6341 | −0.0996 | 35.7 | −0.9 | 21.3 | −14.9 | 0.0159 |
| | center | 46.72 | 24.59 | 12.30 | La2O3 | 16.39 | TiO2 | 1.7336 | | 36.6 | | 36.2 | | |
| Example 91 | periphery | 46.72 | 24.59 | 1.23 | La2O3 | 14.75 | TiO2 | 1.6204 | −0.1132 | 37.1 | 0.5 | 15.3 | −20.9 | 0.0000 |
| | center | 46.72 | 24.59 | 12.30 | La2O3 | 16.39 | TiO2 | 1.7336 | | 36.6 | | 36.2 | | |

TABLE 9

| | | Compsn. (mol %) | | 1st metal species | | 2nd metal species | | nd | Δnd | γd | Δγd | α (*1E7(K)) | Δα | ΔCA1/ΔCM1/CSi |
|---|---|---|---|---|---|---|---|---|---|---|---|---|---|---|
| | | SiO2 | Al2O3 | mol % | oxide | mol % | oxide | | | | | | | |
| Example 92 | periphery | 46.30 | 27.78 | 9.26 | La2O3 | 16.67 | Ta2O5 | 1.7995 | 0.0364 | 39.5 | 2.1 | 35.7 | 1.9 | 0.0648 |
| | center | 46.30 | 0.00 | 0.00 | La2O3 | 13.89 | Ta2O5 | 1.7631 | | 37.4 | | 33.8 | | |
| Example 93 | periphery | 46.30 | 27.78 | 9.26 | La2O3 | 16.67 | Ta2O5 | 1.7997 | 0.0657 | 39.5 | 0.5 | 35.7 | 4.8 | 0.0432 |
| | center | 46.30 | 9.26 | 0.00 | La2O3 | 13.89 | Ta2O5 | 1.7340 | | 39.0 | | 30.9 | | |
| Example 94 | periphery | 53.19 | 12.77 | 3.19 | La2O3 | 30.85 | Ta2O5 | 1.9060 | 0.0411 | 34.4 | −0.2 | 38.3 | 5.5 | 0.0000 |
| | center | 53.19 | 12.77 | 0.00 | La2O3 | 28.72 | Ta2O5 | 1.8648 | | 34.6 | | 32.8 | | |
| Example 95 | periphery | 50.00 | 18.00 | 3.00 | La2O3 | 29.00 | Ta2O5 | 1.8828 | 0.0100 | 34.9 | 0.5 | 31.5 | −3.0 | 0.0533 |
| | center | 50.00 | 10.00 | 0.00 | La2O3 | 27.00 | Ta2O5 | 1.8728 | | 34.4 | | 34.5 | | |
| Example 96 | periphery | 50.00 | 18.00 | 3.00 | La2O3 | 29.00 | Ta2O5 | 1.9144 | −0.0042 | 34.2 | 0.9 | 34.5 | −14.7 | 0.0533 |
| | center | 50.00 | 10.00 | 0.00 | La2O3 | 27.00 | Ta2O5 | 1.9186 | | 33.4 | | 49.2 | | |
| Example 97 | periphery | 42.02 | 25.21 | 8.40 | La2O3 | 24.37 | Ta2O5 | 1.8866 | −0.0076 | 36.2 | 2.3 | 36.2 | −1.7 | 0.0595 |
| | center | 42.02 | 4.20 | 0.00 | La2O3 | 22.69 | Ta2O5 | 1.8943 | | 33.9 | | 37.9 | | |
| Example 98 | periphery | 45.87 | 18.35 | 9.17 | La2O3 | 26.61 | Ta2O5 | 1.9203 | 0.0017 | 35.5 | 2.1 | 43.3 | 0.1 | 0.0436 |
| | center | 45.87 | 0.00 | 0.00 | La2O3 | 24.77 | Ta2O5 | 1.9186 | | 33.4 | | 43.2 | | |
| Example 99 | periphery | 45.87 | 18.35 | 9.17 | La2O3 | 26.61 | Ta2O5 | 1.9203 | 0.0475 | 35.5 | 1.0 | 43.3 | 9.3 | 0.0218 |
| | center | 45.87 | 9.17 | 0.00 | La2O3 | 24.77 | Ta2O5 | 1.8728 | | 34.4 | | 34.0 | | |
| Example 100 | periphery | 45.87 | 18.35 | 9.17 | La2O3 | 26.61 | Ta2O5 | 1.9203 | 0.0260 | 35.5 | 1.6 | 43.3 | 5.4 | 0.0327 |
| | center | 45.87 | 4.59 | 0.00 | La2O3 | 24.77 | Ta2O5 | 1.8943 | | 33.9 | | 37.9 | | |
| Example 101 | periphery | 46.73 | 16.82 | 9.35 | La2O3 | 27.10 | Ta2O5 | 1.9278 | 0.0550 | 35.3 | 0.9 | 43.4 | 9.4 | 0.0171 |
| | center | 46.73 | 9.35 | 0.00 | La2O3 | 25.23 | Ta2O5 | 1.8728 | | 34.4 | | 34.0 | | |

TABLE 10

| | | Compsn. (mol %) | | 1st metal species | | 2nd metal species | | | | | | α | Δα | ΔCA1/ΔCM1 |
|---|---|---|---|---|---|---|---|---|---|---|---|---|---|---|
| | | SiO2 | Al2O3 | mol % | oxide | mol % | oxide | nd | Δnd | γd | Δγd | (*1E7(K)) | | /CSi |
| Example 102 | periphery | 41.67 | 0.00 | 1.67 | BaO | 25.00 | PbO | 1.7781 | 0.0060 | 26.9 | −2.2 | 75.6 | 3.3 | 0.0369 |
| | center | 41.67 | 16.67 | 12.50 | BaO | 29.17 | PbO | 1.7721 | | 29.1 | | 72.3 | | |
| Example 103 | periphery | 38.46 | 6.15 | 1.54 | BaO | 23.08 | PbO | 1.7474 | 0.0005 | 28.5 | −2.0 | 64.3 | −0.2 | 0.0440 |
| | center | 38.46 | 23.08 | 11.54 | BaO | 26.92 | PbO | 1.7469 | | 30.4 | | 64.5 | | |
| Example 104 | periphery | 53.10 | 0.00 | 0.00 | ZnO | 15.93 | TiO2 | 1.6456 | −0.0004 | 32.7 | −2.8 | 27.6 | 0.4 | 0.0122 |
| | center | 53.10 | 11.50 | 17.70 | ZnO | 17.70 | TiO2 | 1.6460 | | 35.5 | | 27.2 | | |
| Example 105 | periphery | 50.00 | 8.33 | 0.00 | ZnO | 15.00 | TiO2 | 1.6289 | −0.0080 | 34.5 | −1.8 | 25.5 | 1.2 | 0.0100 |
| | center | 50.00 | 16.67 | 16.67 | ZnO | 16.67 | TiO2 | 1.6369 | | 36.3 | | 24.3 | | |
| Example 106 | periphery | 54.55 | 9.09 | 13.64 | BaO | 22.73 | Sb2O3 | 1.7419 | −0.0039 | 33.3 | 3.0 | 46.8 | 5.5 | 0.0122 |
| | center | 54.55 | 0.00 | 0.00 | BaO | 18.18 | Sb2O3 | 1.7458 | | 30.4 | | 41.3 | | |
| Example 107 | periphery | 58.82 | 9.80 | 1.96 | La2O3 | 5.88 | Nb2O5 | 1.6005 | −0.0308 | 39.6 | −1.2 | 5.9 | −7.9 | 0.0680 |
| | center | 58.82 | 29.41 | 6.86 | La2O3 | 4.90 | Nb2O5 | 1.6314 | | 40.8 | | 13.8 | | |
| Example 108 | periphery | 50.00 | 0.00 | 0.00 | Y2O3 | 8.00 | Ta2O5 | 1.6412 | −0.0523 | 43.0 | −1.7 | 23.5 | −8.6 | 0.0600 |
| | center | 50.00 | 30.00 | 10.00 | Y2O3 | 10.00 | Ta2O5 | 1.6935 | | 44.7 | | 32.1 | | |
| Example 109 | periphery | 48.28 | 6.90 | 3.45 | BaO | 8.97 | TiO2 | 1.5859 | −0.0472 | 40.7 | −2.0 | 31.5 | −21.1 | 0.0166 |
| | center | 48.28 | 20.69 | 20.69 | BaO | 10.34 | TiO2 | 1.6331 | | 42.7 | | 52.6 | | |
| Example 110 | periphery | 51.85 | 7.41 | 3.70 | BaO | 5.93 | Nb2O5 | 1.6142 | 0.0000 | 38.2 | −1.3 | 8.5 | −2.5 | 0.0193 |
| | center | 51.85 | 22.22 | 18.52 | BaO | 7.41 | Nb2O5 | 1.6596 | | 39.5 | | 31.0 | | |
| Example 111 | periphery | 50.00 | 7.14 | 3.57 | BaO | 9.29 | Ta2O5 | 1.6665 | −0.0260 | 43.3 | −1.0 | 37.6 | −15.3 | 0.0200 |
| | center | 50.00 | 21.43 | 17.86 | BaO | 10.71 | Ta2O5 | 1.6925 | | 44.3 | | 52.9 | | |

What is claimed is:

1. A glass body with distributed composition containing Si oxide, Al oxide and an oxide of a first metal species other than Si and Al in respective molar ratios based on the glass body, in which the molar ratio of the oxide of the first metal species changes in the glass body, wherein there applies the relationship:

$$-0.12 \leq (\Delta C_{Al}/\Delta C_{Ml})/C_{Si} \leq 0.12$$

in which $C_{Si}$ represents the molar ratio of $SiO_2$ at a position of the glass body where the molar ratio of the oxide of the first metal species is the largest;

$\Delta C_{Al}$ represents a normalized difference between maximum and minimum values of the molar ratio of $Al_2O_3$ contained in the glass body, said normalized difference being obtained by dividing the maximum minimum value difference by $C_{Si}$ and $\Delta C_{Ml}$ represents a normalized difference between maximum and minimum values of the molar ratio of the oxide of the first metal species contained in the glass body, said normalized difference being obtained by dividing the maximum minimum value difference of the molar ratio of the oxide of said first metal species by $C_{Si}$.

2. The glass body with distributed composition according to claim 1, wherein the first metal species is at least one element selected from the group consisting of rare-earth elements, alkaline-earth elements and Zn.

3. The glass body with distributed composition according to claim 1 or 2, which further contains an oxide of at least one second metal species other than the first metal species, said second metal species being selected from the group consisting of Nb, Ta, Ti, Pb, Zr, Bi, Sb, Ag, Sn, In, Tl and Zn.

4. The glass body with distributed composition according to claim 1 or 2, wherein the ratio in number of atoms of the first metal species to Si has a gradient in said glass body which changes in the same direction through said glass body as that of a gradient in said glass body of the ratio in number of atoms of Al to Si.

5. The glass body with distributed composition according to claim 3, wherein the ratio in number of atoms of the first metal species to Si has a gradient in said glass body which changes in the same direction through said glass body as that of a gradient in said glass body of the ratio in number of atoms of Al to Si.

6. The glass body with distributed composition according to claim 1, wherein there applies the relationship:

$$-0.08 \leq (\Delta C_{Al}/\Delta C_{Ml})/C_{Si} \leq 0.08.$$

7. The glass body with distributed composition according to claim 1, wherein there applies the relationship:

$$-0.06 \leq (\Delta C_{Al}/\Delta C_{Ml})/C_{Si} \leq 0.06.$$

8. The glass body with distributed composition according to claim 1, wherein there applies the relationship:

$$-0.04 \leq (\Delta C_{Al}/\Delta C_{Ml})/C_{Si} \leq 0.04.$$

9. The glass body with distributed composition according to claim 1, wherein there applies the relationship:

$$Y+0.1 \geq |(0.1/50) \cdot X|,$$

and $$0.1-Y \geq |(0.1/50) \cdot X|,$$

wherein X and Y are defined as $X = \Delta\alpha \times 10^7 K$ and $Y = (\Delta C_{Al}/\Delta C_{Ml})/C_{Si}$ provided that $\Delta\alpha$ is a thermal expansion coefficient difference in the glass body.

10. The glass body with distributed composition according to claim 1, wherein there applies the relationship:

$$Y+0.2 \geq |(0.1/50) \cdot X|,$$

and $$0.2-Y \geq |(0.1/50) \cdot X|,$$

wherein X and Y are defined as $X = \Delta\alpha \times 10^7 K$ and $Y = (\Delta C_{Al}/\Delta C_{Ml})/C_{Si}$ provided that $\Delta\alpha$ is a thermal expansion coefficient difference in the glass body.

* * * * *